United States Patent
Matsumoto et al.

(10) Patent No.: US 8,184,035 B2
(45) Date of Patent: May 22, 2012

(54) INSULATED ULTRAFINE POWDER AND HIGH DIELECTRIC CONSTANT RESIN COMPOSITE MATERIAL

(75) Inventors: Takahiro Matsumoto, Chiba (JP); Toshiaki Yamada, Ibaraki (JP); Hirotaka Tsuruya, Chiba (JP); Takuya Goto, Ibaraki (JP); Masahiro Fujiwara, Osaka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 692 days.

(21) Appl. No.: 11/573,307

(22) PCT Filed: Aug. 4, 2005

(86) PCT No.: PCT/JP2005/014343
§ 371 (c)(1),
(2), (4) Date: Jan. 7, 2009

(87) PCT Pub. No.: WO2006/013947
PCT Pub. Date: Feb. 9, 2006

(65) Prior Publication Data
US 2011/0102231 A1 May 5, 2011

(30) Foreign Application Priority Data

| Aug. 6, 2004 | (JP) | 2004-230159 |
| Aug. 6, 2004 | (JP) | 2004-230160 |
| Oct. 27, 2004 | (JP) | 2004-312190 |
| Oct. 27, 2004 | (JP) | 2004-312191 |
| May 12, 2005 | (JP) | 2005-139484 |

(51) Int. Cl.
*H01Q 17/00* (2006.01)
(52) U.S. Cl. .......................................................... 342/1
(58) Field of Classification Search ................... 342/1–4
See application file for complete search history.

(56) References Cited

U.S. PATENT DOCUMENTS 2,757,149 A * 7/1956 Heritage ........................ 524/14
(Continued)

FOREIGN PATENT DOCUMENTS

JP 54-11580 1/1979
(Continued)

OTHER PUBLICATIONS

Japanese Official Action dated Jan. 5, 2012, for JP Application No. 2005-227793.

*Primary Examiner* — Timothy A Brainard
(74) *Attorney, Agent, or Firm* — Antonelli, Terry, Stout & Kraus, LLP.

(57) ABSTRACT

The present invention provides an insulated ultrafine powder containing electrically conductive ultrafine particles coated with an insulation coating, characterized in that the electrically conductive ultrafine particles are formed of a carbon material which is in the form of spherical particles having a diameter of 1 nm or more and 500 nm or less, fibers having a cross-sectional diameter of 1 nm or more and 500 nm or less, or plate-like particles having a thickness of 1 nm or more and 500 nm or less; the insulation coating is formed of an insulating metal oxide or a hydrate thereof; and the thickness of the insulation coating is 0.3 nm or more, and, when the electrically conductive ultrafine particles are in the form of spherical particles, the coating thickness is equal to or less than the diameter of the particles; when the electrically conductive ultrafine particles are in the form of fibers, the coating thickness is equal to or less than the cross-sectional diameter of the fibers; or when the electrically conductive ultrafine particles are in the form of plate-like particles, the coating thickness is equal to or less than the thickness of the plate-like particles; and as well a high-dielectric-constant resin composite material containing the insulated ultrafine powder. The resin composite material exhibits high dielectric constant and radio wave absorbability, while maintaining fundamental characteristics of resin material (i.e., excellent moldability and workability, and light weight).

24 Claims, 2 Drawing Sheets

U.S. PATENT DOCUMENTS

| | | | |
|---|---|---|---|
| 5,077,241 A * | 12/1991 | Moh et al. | 501/84 |
| 5,669,381 A * | 9/1997 | Hyatt | 428/402 |
| 5,756,207 A * | 5/1998 | Clough et al. | 428/375 |
| 6,937,184 B2 * | 8/2005 | Fujieda et al. | 342/70 |
| 7,338,622 B2 * | 3/2008 | Dorfman | 252/511 |
| 2003/0129297 A1 * | 7/2003 | Jakobi et al. | 427/66 |
| 2003/0211380 A1 * | 11/2003 | Hiroi et al. | 429/44 |
| 2005/0035897 A1 * | 2/2005 | Perl et al. | 342/29 |
| 2006/0154071 A1 * | 7/2006 | Homma et al. | 428/403 |
| 2006/0288905 A1 * | 12/2006 | Hirashima et al. | 106/31.6 |

FOREIGN PATENT DOCUMENTS

| | | |
|---|---|---|
| JP | 8-183875 | 7/1996 |
| JP | 2001-237507 | 8/2001 |
| JP | 2002-057485 | 2/2002 |
| JP | 2002-183689 | 6/2002 |
| JP | 2002-531590 | 9/2002 |
| JP | 2002-334612 | 11/2002 |
| JP | 2002-358479 | 12/2002 |
| JP | 2003-317831 | 11/2003 |
| JP | 2004-506530 | 3/2004 |
| JP | 2004-244599 | 9/2004 |
| WO | WO 00/32538 | 6/2000 |
| WO | WO 02/16257 | 2/2002 |
| WO | WO 2004022484 A1 * | 3/2004 |

* cited by examiner

INSULATED ULTRAFINE POWDER AND HIGH DIELECTRIC CONSTANT RESIN COMPOSITE MATERIAL

TECHNICAL FIELD

The present invention relates to a resin composite material exhibiting high dielectric constant (hereinafter may be referred to as a "high-dielectric-constant resin composite material"). The material is suitable for forming an IC (integrated circuit) package, a module substrate, or a layer of high dielectric constant integrated into an electronic component. Particularly, the material is suitable for forming an inner capacitor layer of a multi-layer wiring board. By virtue of its wavelength-shortening effect due to high dielectric constant, the material is useful for miniaturizing a built-in antenna for, for example, a wireless LAN or non-contact IC card/tag, or for improving the sensitivity of such an antenna. Also, the material is useful for thinning a radio wave absorber which prevents radio wave interference in high-frequency electronic devices. In addition, the material is useful for absorbing unnecessary radio waves in a microwave range.

BACKGROUND ART

High-frequency noise is one of the causes for IC data errors. Among known methods for removing such high-frequency noise, one method includes provision of a capacitor having high capacitance on a wiring board. Such a capacitor of high capacitance can be provided by forming a layer of high dielectric constant on the wiring board. A material of high dielectric constant is useful for miniaturization of a built-in antenna or thinning of a radio wave absorber, since the size of the antenna or the thickness of the absorber is almost inversely proportional to the square root of dielectric constant. Particularly, demand has arisen for a resin material exhibiting excellent workability or moldability and having high dielectric constant.

Meanwhile, wireless data communication requires an antenna. Particularly, a non-contact IC card/tag including no power supply—in which electromagnetic wave energy radiated from a reader/writer is converted into drive power for a built-in IC chip—requires performance enhancement and miniaturization of an antenna.

Such high performance of antenna wiring boards may be attained through approaches depending on the frequency range employed for wireless communication. In a well-known method, a loop-like wiring pattern (serving as a coil) and electrodes (corresponding to electrodes of a capacitor) are provided on a wiring board for an antenna, to thereby form a tuning circuit suitable for a frequency employed for wireless communication. In this method, a capacitor of high capacitance is employed, and the capacitor can be provided by forming a layer of high dielectric constant on the wiring board. In the case where the frequency range employed for wireless communication is 300 MHz or more, high antenna performance is attained through a known method employing a wavelength-shortening effect (i.e., the size of an antenna is almost inversely proportional to the square root of dielectric constant).

In recent years, with development of high-density electronic devices and widespread use of wireless data communication devices (e.g., cellular phones), demand has arisen for absorption of unnecessary radio waves.

Hitherto, a resin composite material containing, as a filler, a large amount of powder of ferrite or a soft-magnetic alloy has been employed for such radio wave absorption (see, for example, Patent Document 1). However, with an increase in radio frequency used (toward a microwave range), such a resin composite material raises problems in terms of reduction of magnetic permeability, along with an increase in thickness required for attaining absorption property. In addition, such a resin composite material, which contains, as a filler, a large amount of powder of high specific weight, poses a problem in that the composite material is not suitable for reducing the weight of, in particular, a portable communication device, because of high specific weight of the composite material.

Meanwhile, there has been proposed a method for dispersing, in an insulating medium, a typical electrically conductive filler, such as particles of a carbon material (e.g., graphite or carbon black), or so-called electrically conductive titanium oxide (i.e., titanium oxide coated with antimony-doped tin oxide) (see, for example, Patent Document 2). However, such a method raises a problem in that when the amount of an electrically conductive filler employed is increased so as to reduce the thickness of a radio wave absorber (radio-wave-absorbing sheet) to 1/20 or less the wavelength of radio waves employed (i.e., to increase dielectric constant), a deviation occurs from non-reflective conditions represented by the below-described formula (i.e., in the case where the radio wave absorber is sufficiently separated from a data signal source). Particularly when dielectric constant is to be increased to 20 or more, a considerable deviation occurs, and thus the radio-wave-absorbing sheet must be thickened. Alternatively, when the radio-wave-absorbing sheet is thinned, limitations are imposed on the sheet; for example, the sheet is applied only to radio waves having a wavelength of 1 cm or less and a frequency of 30 GHz or more.

$$\sqrt{\varepsilon} = \tanh\left(2\pi i \sqrt{\varepsilon}\, \frac{d}{\lambda}\right) \qquad [F1]$$

(wherein ∈: complex relative permittivity, d: thickness of radio wave absorber, λ: wavelength of radio wave, i: imaginary unit)

Conventionally, there has been proposed a high-dielectric-constant resin composite material which contains, as a filler, a ferroelectric material (e.g., barium titanate) serving as a high-dielectric-constant filler, in an amount of 65 vol. % or more (i.e., 80 wt. % or more) (see, for example, Patent Document 3).

Meanwhile, there has been proposed a high-dielectric-constant composition prepared through insulation coating of electrically conductive powder with a thermosetting resin (see, for example, Patent Document 4). However, the composition fails to exhibit reliable performance, and thus is not produced on a commercial scale. In practice, a large amount of the aforementioned filler is added to the composition. Therefore, although high dielectric constant is attained, fundamental characteristics of resin material (i.e., workability, moldability, and light weight) are impaired.

A high-dielectric-constant material containing a large amount of an inorganic filler has not yet been commercially employed in, particularly, an antenna board for a non-contact IC card.

For example, in the case of a non-contact IC card employing a frequency of 13.56 MHz, a loop-like wiring pattern serving as a coil is formed on a generally employed resin substrate having a relative dielectric constant of 5 or less, and no capacitor is provided on the substrate. In this IC card, the loop-like wiring pattern serves as an aperiodic magnetic pickup coil, and communication distance is reduced to 10 cm even in an ideal case (in practice, to 1 cm or less).

Since the dielectric constant of the resin constituting the substrate is generally 5 or less, a large electrode area is required for forming a tuning capacitor. In view of the foregoing, there has been proposed a technique in which a plurality of electrode patterns are formed on an antenna board so as to secure a predetermined electrode area, and then the resultant substrate is folded, followed by connection of the electrodes by through-hole wiring (see, for example, Patent Document 5); as well as a technique in which an electrode area required for a tuning capacitor is reduced by increasing the size of an antenna coil (see, for example, Patent Document 6). In the case of the former technique, the antenna board has a complicated structure, and, due to electromagnetic induction between capacitor electrodes formed at a center portion of an antenna coil, magnetic flux is considerably reduced in the antenna coil, and thus sensitivity is reduced. In the case of the latter technique, the size of an antenna board itself is increased. Therefore, in practice, most commercial devices employ a magnetic pickup coil.

Patent Document 1: Japanese Patent Application Laid-Open (kokai) No. 2003-327831
Patent Document 2: Japanese Patent Application Laid-Open (kokai) No. 2002-57485
Patent Document 3: Japanese Patent Application Laid-Open (kokai) No. 2001-237507
Patent Document 4: Japanese Patent Application Laid-Open (kokai) No. S54-11580
Patent Document 5: Japanese Patent Application Laid-Open (kokai) No. 2002-358479
Patent Document 6: Japanese Patent Application Laid-Open (kokai) No. 2002-183689

DISCLOSURE OF THE INVENTION

In order to solve the aforementioned problems, an object of the present invention is to provide means for attaining a high-dielectric-constant resin composite material in which the amount of a filler added is reduced so as to maintain fundamental characteristics of resin material (i.e., workability and moldability). Another object of the present invention is to provide means for attaining miniaturization and performance enhancement of an antenna for wireless data communication of, for example, a non-contact IC card/tag, the means employing the high-dielectric-constant resin composite material. Yet another object of the present invention is to provide means for forming a thin, lightweight radio-wave-absorbing sheet from the high-dielectric-constant resin composite material.

The present inventors have conducted extensive studies on formation of a continuous layer by a filler in a resin material, as well as on the effect of the filler itself in increasing dielectric constant. As a result, the present inventors have found that when insulated ultrafine powder prepared by coating the surface of electrically conductive ultrafine particles with an insulating metal oxide or a hydrate thereof (in particular, an insulating metal oxide having high molecular polarization or a hydrate thereof) is added to a resin material, even if the amount of the insulated ultrafine powder is as small as 5 to 50 vol. %, the resultant resin composite material exhibits high dielectric constant. The present invention has been accomplished on the basis of this finding.

Particularly, the effect of the insulated ultrafine powder in increasing dielectric constant depends not on the dielectric constant of an insulation coating, but on the molecular polarization of the insulation coating. This means that production of the insulated ultrafine powder does not require a firing process for increasing the dielectric constant of the insulation coating (i.e., for attaining a high-density crystalline state of low amorphous ratio). Firing, which is generally carried out at a temperature of 500° C. or higher, would alter properties of electrically conductive ultrafine particles serving as a core of the insulated ultrafine powder. Therefore, the elimination of the requirement for a firing process has important effects other than reduction of energy required for production of the insulated ultrafine powder.

The present inventors have also found that an antenna board for wireless data communication of, for example, a non-contact IC card/tag can be readily produced from the aforementioned high-dielectric-constant resin composite material, and that a radio-wave-absorbing sheet can be produced from a radio wave absorber formed of the high-dielectric-constant resin composite material.

Accordingly, the present invention provides:

(1) an insulated ultrafine powder comprising electrically conductive ultrafine particles coated with an insulation coating, characterized in that the electrically conductive ultrafine particles are formed of a carbon material which is in the form of spherical particles having a diameter of 1 nm or more and 500 nm or less, fibers having a cross-sectional diameter of 1 nm or more and 500 nm or less, or plate-like particles having a thickness of 1 nm or more and 500 nm or less; the insulation coating is formed of an insulating metal oxide or a hydrate thereof; and the thickness of the insulation coating is 0.3 nm or more, and, when the electrically conductive ultrafine particles are in the form of spherical particles, the coating thickness is equal to or less than the diameter of the particles; when the electrically conductive ultrafine particles are in the form of fibers, the coating thickness is equal to or less than the cross-sectional diameter of the fibers; or when the electrically conductive ultrafine particles are in the form of plate-like particles, the coating thickness is equal to or less than the thickness of the plate-like particles;

(2) an insulated ultrafine powder as described in (1) above, wherein the insulation coating is formed of an insulating composite metal oxide represented by the compositional formula: $MTi_{1-x}Zr_xO_3$ (wherein M represents a divalent metal, and x is 0 or more and less than 1);

(3) an insulated ultrafine powder as described in (1) above, wherein the insulating metal oxide is an insulating metal oxide having a molecular polarization of 5 $cm^3$ or more, or a hydrate thereof;

(4) an insulated ultrafine powder as described in (2) above, wherein the insulating composite metal oxide is barium titanate, strontium titanate, lead titanate, barium titanate zirconate, lead titanate zirconate, or an insulating solid solution containing, in its composition, at least one species selected from among these oxides;

(5) an insulated ultrafine powder as described in (1) above, wherein the surface of the carbon material has been subjected to oxidation treatment;

(6) an insulated ultrafine powder as described in (1) above, wherein the carbon material is carbon nanofiber, natural graphite, furnace carbon black, graphitized carbon black, carbon nanotube, or artificial graphite;

(7) an insulated ultrafine powder as described in (3) above, wherein the insulating metal oxide or a hydrate thereof is titanium dioxide, zirconium dioxide, ditantalum pentoxide, a solid solution of zirconium dioxide and silicon dioxide, silicon dioxide, dialuminum trioxide, or a hydrate of any of these metal oxides;

(8) a high-dielectric-constant resin composite material containing an insulated ultrafine powder as recited in (1) above, and a resin, wherein the ratio by volume of the insulated ultrafine powder to the resin is 5/95 to 50/50;

(9) a high-dielectric-constant resin composite material as described in (8) above, which has a specific weight of 2 or less;

(10) a high-dielectric-constant resin composite material as described in (8) above, which further contains a filler;

(11) a high-dielectric-constant resin composite material as described in (8) above, which has a relative dielectric constant of 20 or more;

(12) an antenna board comprising a high-dielectric-constant resin composite material as recited in (8) above;

(13) an antenna board as described in (12) above, which comprises at least one layer which is formed of the high-dielectric-constant resin composite material, and which has a thickness of 1 μm or more and 3 mm or less;

(14) a non-contact IC card/tag characterized by comprising an antenna board as recited in (12) above;

(15) a radio wave absorber comprising a high-dielectric-constant resin composite material as recited in (8) above;

(16) a radio-wave-absorbing sheet comprising a radio wave absorber as recited in (15) above, which has a thickness 1/20 or less the wavelength of a radio wave which is absorbed therein;

(17) an electronic device comprising, in the interior of a casing, a radio wave absorber as recited in (15) above;

(18) a high-dielectric-constant film or sheet formed from a high-dielectric-constant resin composite material as recited in (8) above;

(19) an electronic component characterized by comprising a high-dielectric-constant film or sheet as recited in (18) above;

(20) an electronic component formed from a high-dielectric-constant resin composite material as recited in (8) above;

(21) a method for producing an insulated ultrafine powder as recited in (1), the method comprising a step of depositing a metal oxide or a hydrate thereof on the surface of electrically conductive ultrafine particles through sol-gel reaction of at least one metal alkoxide in an organic solvent in which the electrically conductive ultrafine particles are dispersed and the metal alkoxide is dissolved;

(22) an insulated ultrafine powder production method as described in (21) above, which comprises the step of depositing a metal oxide or a hydrate thereof on the surface of electrically conductive ultrafine particles; and subsequently a step of firing the resultant product in a non-oxidative atmosphere; and

(23) an insulated ultrafine powder production method as described in (21) above, which comprises the step of depositing a metal oxide or a hydrate thereof on the surface of electrically conductive ultrafine particles; and subsequently a step of heating a coating reaction mixture, to thereby dehydrate the metal oxide or a hydrate thereof in a liquid phase.

The resin composite material of the present invention—which contains a small amount of insulated ultrafine powder prepared through insulation coating of electrically conductive ultrafine particles (in particular, insulated ultrafine powder prepared by insulating electrically conductive ultrafine particles with an insulating metal oxide having high molecular polarization or a hydrate thereof)—exhibits high dielectric constant and radio wave absorbability, while maintaining fundamental characteristics of resin material (i.e., excellent moldability and workability, and light weight).

The antenna board of the present invention, which comprises the aforementioned resin composite material, can attain miniaturization and performance enhancement of an antenna for wireless data communication of, for example, a non-contact IC card/tag.

BRIEF DESCRIPTION OF THE DRAWINGS

FIG. 1 shows a wiring pattern formed on the top surface of an antenna film substrate in Example 20.
FIG. 2 shows a wiring pattern formed on the bottom surface of the antenna film substrate in Example 20.
FIG. 3 shows the appearance of a brass cavity resonator employed for observing radio-wave-absorbing effect.

DESCRIPTION OF REFERENCE NUMERALS

Figure 1:
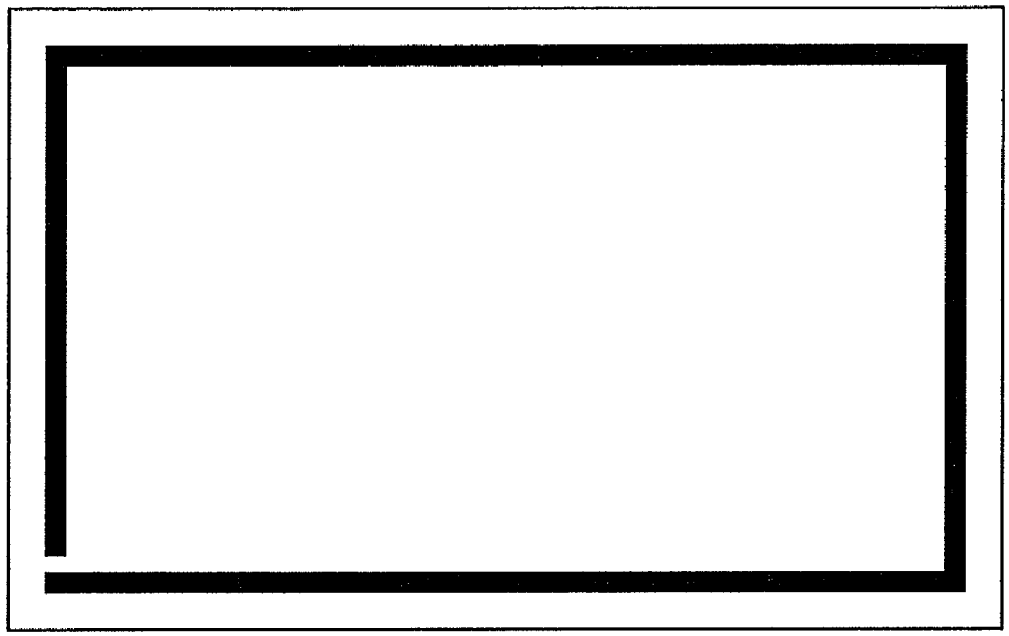
[FIG. 1]

1. Input terminal
2. Output terminal

BEST MODE FOR CARRYING OUT THE INVENTION

When the electrically conductive ultrafine particles employed in the present invention are added as a solo conductive additive to a resin material, the resultant resin composite material exhibits reduced volume resistance. That is, the electrically conductive ultrafine particles exhibit the effect of imparting electrical conductivity to the resin material. Examples of the material constituting the electrically conductive ultrafine particles employed in the present invention include electrically conductive carbon materials, such as natural graphite, artificial graphite, furnace carbon black, graphitized carbon black, carbon nanotube, and carbon nanofiber.

In contrast to such an electrically conductive carbon material, ultrafine powder of a metal (i.e., a typical electrical conductor) is readily oxidized, except for ultrafine powder of some noble metals. In addition, the electrical conductivity of such metal ultrafine powder is likely to be reduced, and the ultrafine powder could cause dust explosion. Meanwhile, metal atoms could be diffused from the ultrafine powder into an insulating medium, thereby impairing the insulating property of the resultant composite material.

The electrically conductive carbon material does not raise such problems, and has a specific weight as low as 2.2; i.e., a characteristic which is absent in another electrically conductive substance or a conventional high-dielectric-constant filler. When the electrically conductive carbon material is employed in a high-dielectric-constant composite material, the weight of the composite material can be reduced.

Preferably, the surface of the electrically conductive ultrafine particles formed of such a carbon material is subjected to oxidation treatment before the particles are is coated with the below-described insulating metal oxide. Examples of the oxidation treatment include oxidation in an oxygen-containing atmosphere; oxidation by use of an aqueous solution of, for example, nitric acid, potassium permanganate, or hydrogen peroxide; and oxidation by use of, for example, an oxidation catalyst formed of ruthenium trichloride and sodium hypochlorite.

The electrically conductive ultrafine particles employed in the present invention may be formed of a carbon material in the form of spherical particles having a diameter of 1 nm or more and 500 nm or less, preferably 5 nm or more and 300 nm or less, more preferably 10 nm or more and 100 nm or less (hereinafter the carbon material may be referred to as a "spherical carbon material"). Such a spherical carbon material (e.g., carbon black) is produced through thermal decomposition of a hydrocarbon raw material in a vapor phase. Graphitized carbon black is produced by vaporizing a carbon material through arc discharge in a reduced-pressure container (inner pressure: 2 to 19 Torr) containing an atmosphere of He, CO, or a gas mixture thereof, followed by cooling and condensation of the thus-vaporized carbon. Specific examples of the spherical carbon material include Seast S, electrically conductive carbon blacks #5500, #4500, #4400, and #4300, and graphitized carbon blacks #3855, #3845, and #3800 (products of Tokai Carbon Co., Ltd.); #3050B, #3030B, #3230B, #3350B, MA7, MA8, and MA11 (products of Mitsubishi Chemical Corporation), and Ketjenblack EC and Ketjenblack EC600JD (products of Lion Corporation). As used herein, "spherical carbon material" does not necessarily have a strictly spherical form, so long as it assumes an isotropic form. For example, the spherical carbon material may be in the form of polyhedron having angles.

The electrically conductive ultrafine particles employed in the present invention may also be formed of a carbon material in the form of fibers having a cross-sectional diameter of 1 nm or more and 500 nm or less, preferably 5 nm or more and 300 nm or less, more preferably 10 nm or more and 200 nm or less (hereinafter the carbon material may be referred to as a "fibrous carbon material"). The length of such a fibrous carbon material is preferably 3 times or more and 300 times or less the cross-sectional diameter thereof. Such a fibrous carbon material (e.g., carbon nanofiber or carbon nanotube) is produced by mixing a cobalt- or iron-containing organometallic compound serving as a catalyst with a hydrocarbon raw material in a vapor phase, and by heating the resultant mixture. Carbon nanofiber may be produced by melt-spinning a phenolic resin, followed by heating in an inert atmosphere. Specific examples of the fibrous carbon material include VGCF and VGNF (products of Showa Denko K.K.); Carbere (product of GSI Creos Corporation); and Carbon Nanofiber (product of Gunei Chemical Industry Co., Ltd.). As used herein, "fibrous carbon material" refers to a carbon material having a unidirectionally elongated form. For example, the fibrous carbon material may be in the form of rectangular column, round bar, or prolate spheroid.

The electrically conductive ultrafine particles employed in the present invention may also be formed of a carbon material in the form of plate-like particles having a thickness of 1 nm or more and 500 nm or less, preferably 5 nm or more and 300 nm or less, more preferably 10 nm or more and 200 nm or less (hereinafter the carbon material may be referred to as a "plate-like carbon material"). The length or width of such a plate-like carbon material is preferably 3 times or more and 300 times or less the thickness thereof. Such a plate-like carbon material is produced through, for example, purification, pulverization, and classification of natural graphite or artificial graphite. Examples of the plate-like carbon material include SNE series and SNO series (products of SEC Carbon, Limited); and scaly graphite powder and flaky graphite powder (products of Nippon Graphite Industries, Ltd.). Such a carbon material may be further subjected to pulverization and precise classification. As used herein, "plate-like carbon material" refers to a carbon material having a unidirectionally compressed form. For example, the plate-like carbon material may be in the form of flattened spherical form or scale-like form.

In the case where the particle diameter, cross-sectional diameter, or thickness of the electrically conductive ultrafine particles is below the aforementioned range, electrical conductivity is lowered due to the quantum size effect. Electrically conductive ultrafine particles having such a small diameter or thickness are difficult to produce, and fails to be employed industrially. In addition, handling of such ultrafine powder becomes difficult due to, for example, aggregation. In contrast, in the case where the particle diameter, cross-sectional diameter, or thickness of the electrically conductive ultrafine particles exceeds the aforementioned range, when the ultrafine powder is added in an amount of 50 vol. % or less (i.e., when the ultrafine powder is added in such an amount that resin properties are not impaired), a continuous layer fails to be formed. When the electrically conductive ultrafine particles are in the form of fibers or plate-like particles, the aspect ratio is preferably 3 to 300. Regarding the form of the electrically conductive ultrafine particles employed in the present invention, fibrous form is preferred to spherical or plate-like form. This is because, when the electrically conductive ultrafine particles having a fibrous form are added for preparing a resin composite material having a relative dielectric constant of 20 or more, the amount of the ultrafine powder required for forming a continuous layer in the composite material can be reduced to, for example, 30 vol. % or less.

In the present invention, one of the purposes for employing an insulation coating is to secure the overall insulating property of a resin composite material. When an insulation coating is provided on the surface of the electrically conductive ultrafine particles, the dielectric constant of the thus-insulated ultrafine powder itself becomes twice that of the material constituting the insulation coating. Therefore, when the electrically conductive ultrafine particles are in the form of spherical particles, the thickness of the insulation coating is regulated to be equal to or less than the diameter of the particles; when the ultrafine powder is in the form of fibers, the coating thickness is regulated to be equal to or less than the cross-sectional diameter of the fibers; or when the ultrafine powder is in the form of plate-like particles, the coating thickness is regulated to be equal to or less than the thickness of the plate-like particles. More preferably, the thickness of the insulation coating is regulated to be 0.3 nm or more, and the ratio of the thickness of the insulation coating to the particle diameter, cross-sectional diameter, or thickness of the electrically conductive ultrafine particles is regulated to be 0.01 or more and 0.9 or less. Most preferably, the thickness of the insulation coating is regulated to be 0.3 nm or more, and the ratio of the thickness of the insulation coating to the particle diameter, cross-sectional diameter, or thickness of the electrically conductive ultrafine particles is regulated to be 0.01 or more and 0.5 or less. When the thickness of the insulation coating is below the aforementioned range, the insulating effect of the coating may be reduced, and the insulation coating may fail to prevent electrical conduction; i.e., the resultant product may fail to function as a dielectric. In contrast, when the thickness of the insulation coating exceeds the aforementioned range, the effect of doubling the dielectric constant of the electrically conductive ultrafine particles serving as a core may be reduced, and thus the relative dielectric constant of the resultant resin composite material may be reduced.

In the present invention, the material of the insulation coating is an insulating metal oxide or a hydrate thereof. Examples of insulating metal oxides include silicon dioxide, dialuminum trioxide, and zirconium dioxide. Examples of hydrates of such oxides include silicon tetrahydroxide, aluminum trihydroxide, and zirconium tetrahydroxide. Such hydrates encompass hydrates having a partially dehydrated and condensed structure. The insulation coating material is preferably an insulating metal oxide having a relative dielectric constant of 20 or more (e.g., ditantalum pentoxide), anatase or brookite titanium dioxide, or zirconium titanate. The insulation coating material may be a solid solution of such oxides.

Among the aforementioned oxides and hydrates, preferred is titanium dioxide, zirconium dioxide, ditantalum pentoxide, a solid solution of zirconium dioxide and silicon dioxide, silicon dioxide, dialuminum trioxide, or a hydrate thereof.

The insulation coating material is more preferably a metal oxide having a relative dielectric constant of 100 or more. Examples of such a metal oxide include rutile titanium dioxide ($TiO_2$); an insulating metal oxide represented by the compositional formula: $MTi_{1-x}Zr_xO_3$ (wherein M represents a divalent metal, and x is 0 or more and less than 1), such as barium titanate ($BaTiO_3$), strontium titanate ($SrTiO_3$), lead titanate ($PbTiO_3$), barium titanate zirconate ($BaTiO_{0.5}Zr_{0.5}O_3$), or lead titanate zirconate ($PbTi_{0.5}Zr_{0.5}O_3$); a hydrate of such an oxide; and an insulating solid solution containing, in its composition, at least one species selected from among these oxides. When such a high-dielectric-constant material is employed, even if the thickness of the insulation coating is increased, the dielectric constant of the resultant composite material is not reduced, which is preferred.

The material of the insulation coating is preferably an insulating metal oxide having a molecular polarization of 5 $cm^3$ or more, or a hydrate thereof. In many cases, molecular polarization of a paraelectric metal oxide is calculated according to the following Clausius-Mossotti equation by use of the dielectric constant, specific weight, and formula weight of the metal oxide:

$$\alpha = \frac{\varepsilon - 1}{\varepsilon + 2} \cdot \frac{M}{\rho} \quad [F2]$$

(wherein $\alpha$: molecular polarization, $\varepsilon$: relative dielectric constant, M: formula weight, $\rho$: specific weight).

As used herein, "formula weight of a metal oxide" refers to the formula weight of the corresponding single-metal-containing oxide. For example, molecular polarization of dialuminum trioxide ($Al_2O_3$) is calculated by use of the formula weight of $AlO_{1.5}$, and molecular polarization of ditantalum pentoxide ($Ta_2O_5$) is calculated by use of the formula weight of $TaO_{2.5}$. Meanwhile, molecular polarization of a single-metal-containing oxide (e.g., silicon dioxide or titanium dioxide) is calculated in a typical manner by use of the formula weight of $SiO_2$ or $TiO_2$.

Particularly, when an insulation coating formed of a material of high molecular polarization is employed, the resultant resin composite material exhibits high dielectric constant, as compared with the case where an insulation coating having the same thickness but being formed of a material of low molecular polarization is employed. Examples of the material of high molecular polarization include insulating metal oxides having a molecular polarization of 9 $cm^3$ or more, such as silicon dioxide and dialuminum trioxide; and hydrates of these oxides, such as silicon tetrahydroxide and aluminum trihydroxide. Such hydrates encompass hydrates having a partially dehydrated and condensed structure. The material of high molecular polarization is preferably a solid solution having a molecular polarization of 15 $cm^3$ or more; for example, so-called zircon (i.e., a solid solution of zirconium dioxide and silicon dioxide), or a hydrate thereof (e.g., a solid solution of zirconium tetrahydroxide and silicon tetrahydroxide). Such a hydrate encompasses hydrates having a partially dehydrated and condensed structure. The material of high molecular polarization is more preferably a metal oxide having a molecular polarization of 17 $cm^3$ or more; for example, titanium dioxide, zirconium dioxide, ditantalum pentoxide, or a hydrate thereof (e.g., titanium tetrahydroxide, zirconium tetrahydroxide, or tantalum pentahydroxide). Such a hydrate encompasses hydrates having a partially dehydrated and condensed structure.

The insulation coating can be formed through a known process. For example, the insulation coating may be formed through the following process: a metal salt is reacted with an alkali in an aqueous dispersion of electrically conductive ultrafine particles, to thereby deposit a metal hydroxide on the surface of the electrically conductive ultrafine particles serving as nuclei; and the resultant product is subjected to filtration, and then dehydration-condensation through drying, to thereby form a product in which an insulating metal oxide is deposited on the surface of the electrically conductive ultrafine particles. In this process, the alkali may be added dropwise to a dispersion which has been prepared in advance by dispersing the electrically conductive ultrafine particles in an aqueous solution of the metal salt; or an aqueous solution of the metal salt and an aqueous solution of the alkali may be simultaneously or sequentially added dropwise to an aqueous dispersion of the electrically conductive ultrafine particles. Alternatively, the insulation coating may be formed through the following process: electrically conductive ultrafine particles are dispersed in an organic solvent (e.g., alcohol); a metal alkoxide is added to the resultant dispersion, to thereby deposit, through sol-gel reaction, a metal hydroxide on the surface of the electrically conductive ultrafine particles serving as nuclei; and the resultant product is subjected to dehydration-condensation reaction in an organic solvent, to thereby form a product in which an insulating metal oxide is deposited on the surface of the electrically conductive ultrafine particles. Of the aforementioned processes, the process in which an insulation coating is formed through sol-gel reaction is preferred. In contrast, the process for formation of the insulation coating through reaction between a metal salt and an alkali is not preferred, since the process requires a large amount of water for removal of a salt (i.e., a by-product), and aggregation of the resultant insulated ultrafine powder could occur through coagulation with the salt.

After the insulation coating is formed through sol-gel reaction, preferably, dehydration treatment is carried out. Dehydration may be carried out through a process in which the insulated ultrafine powder is separated from the resultant reaction mixture through filtration, and then the powder is dried. Alternatively, dehydration may be carried out through a process in which, while the reaction mixture is heated, a solvent having a boiling point higher than the heating temperature is added to the reaction mixture for solvent substitution. This process is for carrying out dehydration treatment of the insulation coating in a liquid phase with evaporation of an organic solvent during the course of sol-gel reaction. In the production method for the insulated ultrafine powder, preferably, the insulation coating is subjected to dehydration and condensation in a liquid phase. When filtration and drying are performed without dehydration treatment in a liquid phase, the insulated ultrafine powder is formed into cake during the course of filtration, which is not preferred.

The above reaction process may be followed by firing treatment. In general, firing treatment is carried out at a temperature of 200 to 1,500° C. for 30 minutes to 24 hours. In the case where the electrically conductive ultrafine particles are formed of a carbon material, firing must be carried out in a non-oxidative atmosphere (i.e., an oxygen-blocked atmosphere substituted with nitrogen or argon).

The insulated ultrafine powder of the present invention is produced by insulating, with a metal oxide or a hydrate thereof, an electrically conductive carbon material in the form of spherical particles having a diameter of 1 nm or more and 500 nm or less, fibers having a cross-sectional diameter of 1 nm or more and 500 nm or less, or plate-like particles having a thickness of 1 nm or more and 500 nm or less. When the insulated ultrafine powder of the present invention is incorporated into a resin in an amount of 50 vol. % or less, a high-dielectric-constant resin composite material exhibiting a relative dielectric constant of 20 or more is produced. When a conventional high-dielectric-constant filler is employed for the production of a high-dielectric-constant resin composite material exhibiting a relative dielectric constant of 20 or more, the filler must be incorporated in an amount of about 50 vol. % or more. In contrast, when the insulated ultrafine powder of the present invention is employed, the amount of the ultrafine powder incorporated can be reduced to 50 vol. % or less (e.g., 5 to 50 vol. %). Therefore, a resin composite material containing the insulated ultrafine powder of the present invention exhibits high dielectric constant, while maintaining fundamental characteristics of resin material (i.e., moldability and light weight).

Examples of the resin component employed in the present invention (i.e., the resin component to which the insulated ultrafine powder is added) include thermoplastic resins such as PVC resin, phenoxy resin, fluorocarbon resin, PPS resin, PPE resin, polystyrene resin, polyolefin resin, polyimide resin, and polyamide resin; and resin mixtures thereof. Polyimide resin is particularly preferred, from the viewpoints of excellent insulating property and excellent adhesion to a layer of a metal (e.g., copper).

The resin component into which the insulated ultrafine powder is incorporated may be in the form of a polymer or a polymerizable compound. Specifically, the insulated ultrafine powder may be incorporated into a polymerizable compound; for example, a monomer or oligomer of a thermosetting resin (e.g., phenoxy resin, epoxy resin, cyanate ester resin, vinyl ester resin, phenolic resin, xylene resin, melamine resin, or polyurethane resin), followed by polymerization of the resultant mixture.

A resin composition containing epoxy resin is particularly preferably employed in a wiring board, etc., since the composition exhibits high adhesive strength to a layer of a metal (e.g., copper).

If necessary, the aforementioned high-dielectric-constant resin composite material may further contain a filler for purposes other than enhancement of dielectric constant. Examples of the filler include glass fiber for enhancement of elastic modulus; calcium carbonate for reduction of percent mold shrinkage; talc for improvement of surface smoothness or wear resistance; and mica for improvement of dimension stability. Examples of flame-retardancy-imparting fillers (i.e., flame retardants) include halogen- or phosphorus-containing flame retardants, aluminum hydroxide, and magnesium hydroxide.

When the high-dielectric-constant resin composite material is employed as a radio wave absorber, the material may further contain a filler; for example, ferrite powder or magnetic metal powder predominantly containing iron, which has been conventionally employed for controlling radio wave absorption property, carbon- or tin oxide-containing electrically conductive powder, or expandable graphite powder (i.e., electrically conductive powder serving as a flame retardant).

In the present invention, the amount of the insulated ultrafine powder added to a resin composition is 5 to 50 vol. %, preferably 5 to 30 vol. %, on the basis of the entirety of the composition. When the powder amount is below the above range, a continuous layer fails to be formed in the resin composition, and sufficient relative dielectric constant fails to be attained, whereas when the powder amount exceeds the above range, fundamental characteristics of the resin composition (e.g., moldability) are impaired.

Since the high-dielectric-constant resin composite material of the present invention contains the insulated ultrafine powder formed of a carbon material, the specific weight of the composite material can be reduced to 2 or less.

Particularly when the high-dielectric-constant resin composite material of the present invention is employed for producing an antenna board, the resin composite material preferably exhibits a relative dielectric constant of 20 or more. An antenna board can be produced by providing a wiring pattern on at least one surface of a layer (thickness: 1 μm or more and 3 mm or less) formed from the high-dielectric-constant resin composite material (more specifically, a film having a thickness of 1 μm to 100 μm, or a sheet having a thickness of 100 μm to 3 mm). If necessary, through holes may be provided in a film or sheet formed of the high-dielectric-constant resin composite material. The wiring pattern of such an antenna board may be connected directly to an IC for producing a non-contact IC card/tag. Alternatively, such an antenna board may be employed as a booster antenna by bringing the substrate into contact with a card/tag with built-in IC. When a film or sheet formed of the high-dielectric-constant resin composite material is employed in an antenna board or a non-contact IC card, if necessary, a protective film or the like may be attached onto the composite material film or sheet.

When the insulated ultrafine powder of the present invention is incorporated into a resin in an amount of 5 vol. % or more and 50 vol. % or less, a radio wave absorber exhibiting a relative dielectric constant of 20 or more is produced. When a conventional high-dielectric-constant filler is employed for the production of a radio wave absorber exhibiting a relative dielectric constant of 20 or more, the filler must be incorporated in an amount of about 50 vol. % or more. In contrast, when the insulated ultrafine powder of the present invention is employed, the amount of the ultrafine powder incorporated can be reduced to 50 vol. % or less (e.g., 5 to 50 vol. %). Therefore, a resin composite material containing the insulated ultrafine powder of the present invention exhibits high dielectric constant and radio wave absorbability in a microwave range, while maintaining fundamental characteristics of resin material (i.e., moldability and light weight).

When such a radio wave absorber formed of the high-dielectric-constant resin composite material of the present invention, which exhibits high dielectric constant, is formed into a sheet, the thickness of the sheet can be reduced to ½₀ or less the wavelength of a radio wave absorbed therein.

The radio wave absorber of the present invention can be employed in the interior of a casing of an electronic device. In such a case, the electronic device exhibits excellent performance.

Since the radio wave absorber of the present invention contains the insulated ultrafine powder formed of a carbon material, the specific weight of the radio wave absorber can be reduced to 2 or less, and thus the weight thereof can be further reduced.

EXAMPLES

The present invention will next be described in more detail by way of Examples, which should not be construed as limiting the invention thereto.

Example 1

Carbon nanofiber (VGCF-H, product of Showa Denko K.K., cross-sectional diameter: 150 nm, length: 5 to 6 μm, fibrous carbon material) (5 g) and tetrapropyloxy titanate (11 g) were added to isopropanol (150 g), and the resultant mixture was stirred at room temperature for one hour. A liquid mixture of distilled water and isopropanol (1:6) (77 g) was added dropwise to the resultant dispersion over five minutes. After completion of dropwise addition, the resultant mixture was further stirred for one hour, followed by filtration. The resultant product was allowed to stand for 12 hours for drying, followed by vacuum drying at 100° C. The surface of the thus-obtained powder was observed under a scanning electron microscope. Microscopic observation revealed formation of a titanium dioxide coating (thickness: 30 to 70 nm, mean thickness: 50 nm).

The resultant insulated ultrafine powder (2 g), a bisphenol A epoxy monomer (EP-4100G, product of Adeka Corporation) (8 g), an imidazole curing catalyst (Curezol 2E4MZ, product of Shikoku Chemicals Corporation) (0.16 g), and methyl ethyl ketone (i.e., a solvent) (10 g) were pounded and mixed by means of a homogenizer for 30 minutes. This corresponds to the case where the insulated ultrafine powder (filler) is added in an amount of 10 vol. %. The thus-obtained mixture was placed in a Teflon petri dish, and then allowed to stand for 12 hours for drying, followed by heating at 120° C. for three hours, to thereby yield a plate-like cured product.

Dielectric constant of the cured product was measured at 10 MHz by means of 4294A Impedance Analyzer (product of Agilent). As a result, the cured product was found to have a relative dielectric constant of 92.1. The cured product was found to have a specific weight of 1.3.

Example 2

The procedure of Example 1 was repeated, except that carbon nanofiber (5 g) was heated to 100° C. and subjected to oxidation treatment in 60 wt. % aqueous nitric acid solution for synthesis of insulated ultrafine powder. Dielectric constant of the resultant cured product was measured in a manner similar to that of Example 1. As a result, the cured product was found to have a relative dielectric constant of 86.3. The cured product was found to have a specific weight of 1.3.

Example 3

Natural graphite (SNO-2, product of SEC Carbon, Limited, thickness: 100 to 200 nm, mean thickness: 150 nm, size: 1×1 to 3×3 μm, mean size: 2×2 μm, plate-like carbon material) (5 g) and tetrapropyloxy titanate (1.8 g) were added to isopropanol (25 g), and the resultant mixture was stirred for one hour, followed by stirring at room temperature for one hour. A liquid mixture of distilled water and isopropanol (1:6) (13 g) was added dropwise to the resultant dispersion over five minutes. After completion of dropwise addition, the resultant mixture was further stirred for one hour, followed by filtration. The resultant product was allowed to stand for 12 hours for drying, followed by vacuum drying at 100° C. The surface of the thus-obtained powder was observed under a scanning electron microscope. Microscopic observation revealed formation of a titanium dioxide coating (thickness: 30 to 70 nm, mean thickness: 50 nm).

The resultant insulated ultrafine powder (3.5 g), a bisphenol A epoxy monomer (EP-4100G, product of Adeka Corporation) (6.5 g), an imidazole curing catalyst (Curezol 2E4MZ, product of Shikoku Chemicals Corporation) (0.13 g), and methyl ethyl ketone (i.e., a solvent) (10 g) were pounded and mixed by means of a homogenizer for 30 minutes. This corresponds to the case where the insulated ultrafine powder (filler) is added in an amount of 20 vol. %. The thus-obtained mixture was placed in a Teflon petri dish, and then allowed to stand for 12 hours for drying. The thus-obtained paste was heated at 120° C. for three hours, to thereby yield a plate-like cured product.

Dielectric constant of the cured product was measured in a manner similar to that of Example 1. As a result, the cured product was found to have a relative dielectric constant of 70.1. The cured product was found to have a specific weight of 1.5.

Example 4

Electrically conductive carbon black (product of Tokai Carbon Co., Ltd., particle diameter: 10 to 30 nm, mean diameter: 25 nm, spherical carbon material) (5 g) and tetrapropyloxy titanate (1.8 g) were added to isopropanol (25 g), and the resultant mixture was stirred for one hour, followed by stirring at room temperature for one hour. A liquid mixture of distilled water and isopropanol (1:6) (13 g) was added dropwise to the resultant dispersion over five minutes. After completion of dropwise addition, the resultant mixture was further stirred for one hour, followed by filtration. The resultant product was allowed to stand for 12 hours for drying, followed by vacuum drying at 100° C. The surface of the thus-obtained powder was observed under a scanning electron microscope. Microscopic observation revealed formation of a titanium dioxide coating (thickness: 3 to 7 nm, mean thickness: 5 nm).

The resultant insulated ultrafine powder (2.5 g), a bisphenol A epoxy monomer (EP-4100G, product of Adeka Corporation) (7.5 g), an imidazole curing catalyst (Curezol 2E4MZ, product of Shikoku Chemicals Corporation) (0.15 g), and methyl ethyl ketone (i.e., a solvent) (10 g) were pounded and mixed by means of a homogenizer for 30 minutes. This corresponds to the case where the insulated ultrafine powder is added in an amount of 13 vol. %. The thus-obtained mixture was placed in a Teflon petri dish, and then allowed to stand for 12 hours for drying. The thus-obtained paste was heated at 120° C. for three hours, to thereby yield a plate-like cured product.

Dielectric constant of the cured product was measured in a manner similar to that of Example 1. As a result, the cured product was found to have a relative dielectric constant of 71.6. The cured product was found to have a specific weight of 1.4.

Comparative Example 1

The procedure of Example 1 was repeated, except that the insulated ultrafine powder was replaced by carbon nanofiber (1.5 g), to thereby yield a plate-like cured product. This corresponds to the case where the carbon nanofiber is added in an amount of 7 vol. %. Dielectric constant of the plate-like cured product, which is an electrical conductor having a volume resistivity of 17.2 Ωm, failed to be measured; i.e., the cured product was found not to be a dielectric.

Comparative Example 2

The procedure of Example 1 was repeated, except that the insulated ultrafine powder was replaced by barium titanate powder (diameter: 2 μm) (5 g), the amount of the bisphenol A epoxy monomer was changed to 5 g, and the amount of the curing catalyst was changed to 0.1 g, to thereby yield a plate-like cured product. This corresponds to the case where the barium titanate powder (filler) is added in an amount of 16 vol. %.

Dielectric constant of the cured product was measured in a manner similar to that of Example 1. As a result, the cured product was found to have a relative dielectric constant of 6.8. The cured product was found to have a specific weight of 1.7.

Comparative Example 3

The procedure of Example 1 was repeated, except that the insulated ultrafine powder was replaced by barium titanate powder (diameter: 2 μm) (8 g), the amount of the bisphenol A epoxy monomer was changed to 2 g, and the amount of the curing catalyst was changed to 20 mg, to thereby yield a plate-like cured product. This corresponds to the case where the barium titanate powder (filler) is added in an amount of 50 vol. %.

Dielectric constant of the cured product was measured in a manner similar to that of Example 1. As a result, the cured product was found to have a relative dielectric constant of 21.8. The cured product was found to have a specific weight of 2.9.

The results are shown in Table 1.

TABLE 1

| | Amount of added filler | | Dielectric constant (10 MHz) | Specific weight |
|---|---|---|---|---|
| Example 1 | 10 vol. % | 20 wt. % | 92.1 | 1.3 |
| Example 2 | 10 vol. % | 20 wt. % | 86.3 | 1.3 |
| Example 3 | 20 vol. % | 35 wt. % | 70.1 | 1.5 |
| Example 4 | 13 vol. % | 25 wt. % | 71.6 | 1.4 |
| Comparative Example 1 | 7 vol. % | 15 wt. % | Not measured due to electrical conduction | — |
| Comparative Example 2 | 16 vol. % | 50 wt. % | 6.8 | 1.7 |
| Comparative Example 3 | 50 vol. % | 80 wt. % | 21.8 | 2.9 |

As is clear from the data of Example 1 and Comparative Example 1, electrically conductive ultrafine particles having no insulation coating do not function as a dielectric due to electrical conduction, and an insulation coating imparts dielectric property to the ultrafine powder. As is clear from the data of Examples 1 to 4 (in particular, Example 4, which employs insulated ultrafine powder (filler) prepared by coating carbon black (i.e., spherical electrically conductive ultrafine particles) with a metal oxide) and data of Comparative Examples 2 and 3, which employ barium titanate fine powder (i.e., a typical conventional filler), a composite material containing the insulated ultrafine powder (filler) of the present invention exhibits high dielectric constant and light weight, even when the amount of the filler added is considerably lower than a conventionally required level.

Example 5

Metallic strontium (2.9 g) and tetrapropyloxy titanate (9.3 g) were added to isopropanol (160 g), and the resultant mixture was refluxed at the boiling point of isopropanol for one hour, to thereby yield a colorless, transparent sol. Carbon nanofiber (VGCF-H, product of Showa Denko K.K., cross-sectional diameter: 150 nm, length: 5 to 6 μm) (10 g) was added to the sol, followed by stirring at room temperature for 14 hours. To the resultant mixture was added dropwise a liquid mixture of distilled water (15 g) and isopropanol (120 g) over 30 minutes, followed by stirring for two hours, and then suction filtration. The resultant product was allowed to stand for 12 hours for drying, followed by vacuum drying at 100° C.

The thus-obtained insulated ultrafine powder (2 g), a bisphenol A epoxy monomer (EP-4100G, product of Adeka Corporation) (8 g), an imidazole curing catalyst (Curezol 2E4MZ, product of Shikoku Chemicals Corporation) (0.16 g), and methyl ethyl ketone (i.e., a solvent) (10 g) were pounded and mixed by means of a homogenizer for 30 minutes. This corresponds to the case where the insulated ultrafine powder is added in an amount of 10 vol. %. The thus-obtained mixture was placed in a Teflon petri dish, and then allowed to stand for 12 hours for drying, followed by heating at 120° C. for three hours, to thereby yield a plate-like cured product.

Dielectric constant of the cured product was measured in a manner similar to that of Example 1. As a result, the cured product was found to have a relative dielectric constant of 122.2. The cured product was found to have a specific weight of 1.4.

Example 6

The procedure of Example 5 was repeated, except that carbon nanofiber (5 g) was heated to 100° C. and subjected to oxidation treatment in 60 wt. % aqueous nitric acid solution for synthesis of insulated ultrafine powder. Dielectric constant of the resultant cured product was measured in a manner similar to that of Example 1. As a result, the cured product was found to have a relative dielectric constant of 116.1. The cured product was found to have a specific weight of 1.4.

Example 7

Metallic strontium (0.5 g) and tetrapropyloxy titanate (1.6 g) were added to isopropanol (80 g), and the resultant mixture was refluxed at the boiling point of isopropanol for one hour, to thereby yield a colorless, transparent sol. Natural graphite (SNO-2, product of SEC Carbon, Limited, thickness: 100 to 200 nm, mean thickness: 150 nm, size: 1×1 to 3×3 μm, mean size: 2×2 μm, plate-like carbon material) (10 g) was added to the sol, followed by stirring at room temperature for 14 hours. To the resultant mixture was added dropwise a liquid mixture of distilled water (2.5 g) and isopropanol (20 g) over 30 minutes, followed by stirring for two hours, and then suction filtration. The resultant product was allowed to stand for 12 hours for drying, followed by vacuum drying at 100° C.

The thus-obtained insulated ultrafine powder (3.5 g), a bisphenol A epoxy monomer (EP-4100G, product of Adeka Corporation) (6.5 g), an imidazole curing catalyst (Curezol 2E4MZ, product of Shikoku Chemicals Corporation) (0.13 g), and methyl ethyl ketone (i.e., a solvent) (10 g) were pounded and mixed by means of a homogenizer for 30 minutes. This corresponds to the case where the insulated ultrafine powder (filler) is added in an amount of 20 vol. %.

The thus-obtained mixture was placed in a Teflon petri dish, and then allowed to stand for 12 hours for drying. The thus-obtained paste was heated at 120° C. for three hours, to thereby yield a plate-like cured product.

Dielectric constant of the cured product was measured in a manner similar to that of Example 1. As a result, the cured product was found to have a relative dielectric constant of 110.1. The cured product was found to have a specific weight of 1.6.

Example 8

Metallic strontium (1.5 g) and tetrapropyloxy titanate (4.8 g) were added to isopropanol (80 g), and the resultant mixture was refluxed at the boiling point of isopropanol for one hour, to thereby yield a colorless, transparent sol. Electrically conductive carbon black (product of Tokai Carbon Co., Ltd., particle diameter: 10 to 30 nm, mean diameter: 25 nm, spherical carbon material) (10 g) was added to the sol, followed by stirring at room temperature for 14 hours. To the resultant mixture was added dropwise a liquid mixture of distilled water (7.5 g) and isopropanol (60 g) over 30 minutes, followed by stirring for two hours, and then suction filtration. The resultant product was allowed to stand for 12 hours for drying, followed by vacuum drying at 100° C.

The thus-obtained insulated ultrafine powder (2.5 g), a bisphenol A epoxy monomer (EP-4100G, product of Adeka Corporation) (7.5 g), an imidazole curing catalyst (Curezol 2E4MZ, product of Shikoku Chemicals Corporation) (0.15 g), and methyl ethyl ketone (i.e., a solvent) (10 g) were pounded and mixed by means of a homogenizer for 30 minutes. This corresponds to the case where the insulated ultrafine powder (filler) is added in an amount of 13 vol. %. The thus-obtained mixture was placed in a Teflon petri dish, and then allowed to stand for 12 hours for drying. The thus-obtained paste was heated at 120° C. for three hours, to thereby yield a plate-like cured product.

Dielectric constant of the cured product was measured in a manner similar to that of Example 1. As a result, the cured product was found to have a relative dielectric constant of 102.6. The cured product was found to have a specific weight of 1.4.

Example 9

Electrically conductive carbon black (product of Tokai Carbon Co., Ltd., particle diameter: 10 to 30 nm, mean diameter: 25 nm) (5 g) and tetrapropyloxy titanate (1.8 g) were added to isopropanol (25 g), and the resultant mixture was stirred for one hour, followed by stirring at room temperature for one hour. A liquid mixture of distilled water and isopropanol (1:6) (13 g) was added dropwise to the resultant dispersion over five minutes. After completion of dropwise addition, the resultant mixture was further stirred for one hour, followed by filtration. The resultant product was allowed to stand for 12 hours for drying, followed by vacuum drying at 100° C.

In a manner similar to that of Example 8, the thus-obtained insulated ultrafine powder was mixed with an epoxy monomer, and the resultant mixture was cured. Dielectric constant of the resultant cured product was measured in a manner similar to that of Example 1. The cured product was found to have a relative dielectric constant of 71.2 and a specific weight of 1.4.

The results are shown in Table 2.

TABLE 2

| | Amount of added filler | | Dielectric constant (10 MHz) | Specific weight |
|---|---|---|---|---|
| Example 5 | 10 vol. % | 20 wt. % | 122.2 | 1.4 |
| Example 6 | 10 vol. % | 20 wt. % | 116.1 | 1.4 |
| Example 7 | 20 vol. % | 35 wt. % | 110.1 | 1.6 |
| Example 8 | 13 vol. % | 25 wt. % | 102.6 | 1.4 |
| Example 9 | 13 vol. % | 25 wt. % | 71.2 | 1.4 |
| Comparative Example 1 | 7 vol. % | 15 wt. % | Not measured due to electrical conduction | — |
| Comparative Example 2 | 16 vol. % | 50 wt. % | 6.8 | 1.7 |
| Comparative Example 3 | 50 vol. % | 80 wt. % | 21.8 | 2.9 |

As is clear from the data of Example 5 and Comparative Example 1, electrically conductive ultrafine particles having no insulation coating do not function as a dielectric due to electrical conduction, and an insulation coating imparts dielectric property to the ultrafine powder. Comparison between data of Example 8 and those of Example 9 reveals that employment of an insulation coating formed of strontium titanate (i.e., a composite oxide) provides higher dielectric constant as compared with the case where an insulation coating formed of titanium dioxide is employed; i.e., strontium titanate is preferred to titanium dioxide. As is clear from the data of Examples 5 to 8 (in particular, Example 8, which employs an insulated ultrafine powder prepared by coating carbon black (i.e., spherical electrically conductive ultrafine particles) with an insulating metal oxide) and data of Comparative Examples 2 and 3, which employ barium titanate fine powder (i.e., a typical conventional filler), a resin composite material containing the insulated ultrafine powder of the present invention exhibits high dielectric constant and light weight, even when the amount of the filler added is considerably lower than a conventionally required level.

Example 10

Carbon nanofiber synthesized through the vapor growth process (cross-sectional diameter: 150 nm, length: 5 to 6 μm, fibrous carbon material) (5 g) and tetrapropyloxy titanate (11 g) were added to isopropanol (150 g), and the resultant mixture was stirred at room temperature for one hour. A liquid mixture of distilled water and isopropanol (1:6) (77 g) was added dropwise to the resultant dispersion over five minutes. After completion of dropwise addition, the resultant mixture was further stirred for one hour. Thereafter, while N,N-dimethylacetamide (200 g) was added to the mixture, the mixture was heated to 150° C. for solvent substitution. The resultant suspension was subjected to filtration, followed by drying, to thereby yield 9 g of insulated ultrafine powder.

The surface of the thus-obtained powder was observed under a scanning electron microscope. Microscopic observation revealed formation of a titanium dioxide hydrate coating (thickness: 40 to 60 nm, mean thickness: 50 nm). Anatase titanium dioxide has a relative dielectric constant of 31 and a specific weight of 4.1, and therefore exhibits a molecular polarization of 19 cm$^3$. Similarly, rutile or brookite titanium dioxide exhibits a molecular polarization of 18 to 19 cm$^3$.

The resultant insulated ultrafine powder (2 g), a bisphenol A epoxy monomer (8 g), an imidazole curing catalyst (0.16 g), and methyl ethyl ketone (i.e., a solvent) (10 g) were pounded and mixed by means of a homogenizer for one minute. This corresponds to the case where the insulated ultrafine powder is added in an amount of 10 vol. % (the ratio by volume of the insulated ultrafine powder to the bisphenol A epoxy monomer: 10/90). The thus-obtained mixture was placed in a Teflon petri dish, and then allowed to stand for 12 hours for drying, followed by heating at 120° C. for three hours, to thereby yield a high-dielectric-constant epoxy composite material in the form of plate-like cured product.

Dielectric constant of the cured product was measured in a manner similar to that of Example 1. As a result, the cured product was found to have a relative dielectric constant of 92.1. The cured product was found to a specific weight of 1.3.

Example 11

The procedure of Example 10 was repeated, except that tetrapropyloxy titanate was replaced by tetrabutyloxy zirconate for synthesis of insulated ultrafine powder. The surface of the thus-obtained powder was observed under a scanning electron microscope. Microscopic observation revealed formation of a zirconium dioxide hydrate coating (thickness: 30 to 70 nm, mean thickness: 50 nm). Crystalline zirconium dioxide has a relative dielectric constant of 18 and a specific weight of 5.5, and therefore exhibits a molecular polarization of 19 $cm^3$. Dielectric constant of the resultant high-dielectric-constant epoxy composite material (cured product) was measured in a manner similar to that of Example 1. As a result, the cured product was found to have a relative dielectric constant of 90.7. The cured product was found to have a specific weight of 1.3.

Example 12

The procedure of Example 11 was repeated, except that carbon nanofiber (5 g) was heated to 100° C. and subjected to oxidation treatment in 60 wt. % aqueous nitric acid solution for synthesis of insulated ultrafine powder. Dielectric constant of the resultant high-dielectric-constant epoxy composite material (cured product) was measured in a manner similar to that of Example 1. As a result, the cured product was found to have a relative dielectric constant of 102. The cured product was found to have a specific weight of 1.3.

Example 13

Natural graphite (thickness: 100 to 200 nm, mean thickness: 150 nm, size: 1×1 to 3×3 µm, mean size: 2×2 µm, plate-like carbon material) (5 g) and tetraethoxy silicate (1.8 g) were added to isopropanol (25 g), and the resultant mixture was stirred at room temperature for one hour. A liquid mixture of distilled water and isopropanol (1:6) (13 g) was added dropwise to the resultant dispersion over five minutes. After completion of dropwise addition, the resultant mixture was further stirred for 24 hours. Thereafter, while N,N-dimethylacetamide (30 g) was added to the mixture, the mixture was heated to 150° C. for solvent substitution. The resultant suspension was subjected to filtration, followed by drying, to thereby yield 5.6 g of insulated ultrafine powder.

The surface of the thus-obtained powder was observed under a scanning electron microscope. Microscopic observation revealed formation of a silicon dioxide hydrate coating (thickness: 30 to 50 nm, mean thickness: 40 nm). Crystalline silicon dioxide has a relative dielectric constant of 3.8 and a specific weight of 2.1, and therefore exhibits a molecular polarization of 13 $cm^3$.

The thus-obtained insulated ultrafine powder (3.5 g), a bisphenol A epoxy monomer (6.5 g), an imidazole curing catalyst (0.13 g), and methyl ethyl ketone (i.e., a solvent) (10 g) were pounded and mixed by means of a homogenizer for one minute. This corresponds to the case where the insulated ultrafine powder is added in an amount of 20 vol. %. The thus-obtained mixture was placed in a Teflon petri dish, and then allowed to stand for 12 hours for drying. The thus-obtained paste was heated at 120° C. for three hours, to thereby yield a plate-like cured product.

Dielectric constant of the cured product was measured in a manner similar to that of Example 1. As a result, the cured product was found to have a relative dielectric constant of 69.1. The cured product was found to have a specific weight of 1.2.

Example 14

Carbon black (particle diameter: 10 to 30 nm, mean diameter: 25 nm, spherical carbon material) (5 g) and tripropyloxy aluminate (1.8 g) were added to isopropanol (25 g), and the resultant mixture was stirred at room temperature for one hour. A liquid mixture of distilled water and isopropanol (1:6) (13 g) was added dropwise to the resultant dispersion over five minutes. After completion of dropwise addition, the resultant mixture was further stirred for 12 hours. Thereafter, the solvent was substituted by N,N-dimethylacetamide, and filtration and drying were carried out in a manner similar to that of Example 10, to thereby yield 5.5 g of insulated ultrafine powder.

The surface of the thus-obtained powder was observed under a scanning electron microscope. Microscopic observation revealed formation of a dialuminum trioxide hydrate coating (thickness: 5 to 10 nm, mean thickness: 7 nm). Crystalline dialuminum trioxide has a relative dielectric constant of 9.6 and a specific weight of 3.8, and therefore exhibits a molecular polarization of 10 $cm^3$.

The thus-obtained insulated ultrafine powder (2.5 g), a bisphenol A epoxy monomer (7.5 g), an imidazole curing catalyst (0.15 g), and methyl ethyl ketone (i.e., a solvent) (10 g) were pounded and mixed by means of a homogenizer for 30 minutes. This corresponds to the case where the insulated ultrafine powder is added in an amount of 13 vol. %. The thus-obtained mixture was placed in a Teflon petri dish, and then allowed to stand for 12 hours for drying. The thus-obtained paste was heated at 120° C. for three hours, to thereby yield a plate-like cured product.

Dielectric constant of the cured product was measured in a manner similar to that of Example 1. As a result, the cured product was found to have a relative dielectric constant of 70.7. The cured product was found to have a specific weight of 1.3.

Example 15

Carbon nanotube synthesized through the vapor growth process (cross-sectional diameter: 5 to 11 nm, mean cross-sectional diameter: 8 nm, length: 50 to 200 nm, fibrous carbon material) (5 g) and tetrapropyloxy titanate (1.8 g) were added to isopropanol (2.5 g), and the resultant mixture was stirred for one hour, followed by stirring at room temperature for one hour. A liquid mixture of distilled water and isopropanol (1:6) (1.3 g) was added dropwise to the resultant dispersion over five minutes. After completion of dropwise addition, the resultant mixture was further stirred for one hour, followed by filtration. The resultant product was allowed to stand for 12 hours for drying, followed by vacuum drying at 100° C., to thereby yield 5.6 g of powder.

The surface of the thus-obtained powder was observed under a scanning electron microscope. Microscopic observation revealed formation of a titanium dioxide hydrate coating (thickness: 2 to 4 nm, mean thickness: 3 nm).

The thus-obtained insulated ultrafine powder (2 g), a bisphenol A epoxy monomer (8 g), an imidazole curing catalyst (0.16 g), and methyl ethyl ketone (i.e., a solvent) (10 g) were pounded and mixed by means of a homogenizer for 30 minutes. The thus-obtained mixture was placed in a Teflon petri dish, and then allowed to stand for 12 hours for drying, followed by heating at 120° C. for three hours, to thereby yield a sheet-like cured product having a thickness of 1 mm. This corresponds to the case where the insulated ultrafine powder is added in an amount of 10 vol. %. Dielectric constant of the cured product was measured in a manner similar to that of Example 1. As a result, the cured product was found to have a relative dielectric constant of 189. The cured product was found to have a specific weight of 1.3.

Example 16

Carbon nanofiber synthesized through melt-spinning (cross-sectional diameter: 300 to 500 nm, mean cross-sectional diameter: 400 nm, length: 50 μm, fibrous carbon material) (5 g) and tetrabutyloxy zirconate (18 g) were added to isopropanol (25 g), and the resultant mixture was stirred at room temperature for one hour. A liquid mixture of distilled water and isopropanol (1:6) (1.3 g) was added dropwise to the resultant dispersion over five minutes. After completion of dropwise addition, the resultant mixture was further stirred for one hour. Thereafter, in a manner similar to that of Example 10, the solvent was substituted by N,N-dimethylacetamide, and then filtration and drying were carried out, to thereby yield 9 g of powder.

The surface of the thus-obtained powder was observed under a scanning electron microscope. Microscopic observation revealed formation of a zirconium dioxide hydrate coating (thickness: 90 to 130 nm, mean thickness: 110 nm). A plate-like cured product was formed from the resultant high-dielectric-constant epoxy composite material in a manner similar to that of Example 10. Dielectric constant of the cured product was measured in a manner similar to that of Example 1. As a result, the cured product was found to have a relative dielectric constant of 58.4.

Example 17

The procedure of Example 10 was repeated, except that the insulated ultrafine powder obtained in Example 10 (1 g), a bisphenol A epoxy monomer (9 g), an imidazole curing catalyst (0.16 g), and methyl ethyl ketone (i.e., a solvent) (10 g) were pounded and mixed by means of a homogenizer for one minute, to thereby yield a sheet-like cured product. This corresponds to the case where the insulated ultrafine powder is added in an amount of 5 vol. %. Dielectric constant of the cured product was measured in a manner similar to that of Example 1. As a result, the cured product was found to have a relative dielectric constant of 57.8. The cured product was found to have a specific weight of 1.3.

Example 18

The procedure of Example 11 was repeated, except that the amount of tetrapropyloxy zirconate added was changed to 0.5 g. The surface of the thus-obtained insulated ultrafine powder was observed under a scanning electron microscope. Microscopic observation revealed formation of a zirconium dioxide hydrate coating (thickness: 2 to 7 nm, mean thickness: 5 nm). In a manner similar to that of Example 10, the insulated ultrafine powder was mixed with an epoxy resin, and a cured product was produced. The cured product was found to have a dielectric constant of 178 and a specific weight of 1.3.

Example 19

The procedure of Example 10 was repeated, except that the amount of tetrapropyloxy titanate added was changed to 22 g. The surface of the thus-obtained insulated ultrafine powder was observed under a scanning electron microscope. Microscopic observation revealed formation of a titanium dioxide hydrate coating (thickness: 70 to 130 nm, mean thickness: 100 nm). The resultant cured product was found to have a dielectric constant of 74.3 and a specific weight of 1.3.

Comparative Example 4

The procedure of Example 10 was repeated, except that insulated ultrafine powder (7 g) was mixed with a bisphenol A epoxy monomer (3 g). This corresponds to the case where the insulated ultrafine powder is added in an amount of 60 vol. %. In this case, merely a very brittle cured product was obtained. Dielectric constant of the cured product failed to be measured.

Comparative Example 5

The procedure of Example 10 was repeated, except that the amount of tetrapropyloxy titanate added was changed to 66 g. The surface of the thus-obtained insulated ultrafine powder was observed under a scanning electron microscope. Microscopic observation revealed formation of a titanium dioxide coating (thickness: 200 to 400 nm, mean thickness: 300 nm). The resultant cured product was found to have a dielectric constant of 16.3 and a specific weight of 1.3.

Comparative Example 6

The procedure of Example 10 was repeated, except that the carbon nanofiber was replaced by carbon fiber milled with a ball mill (cross-sectional diameter: 800 nm to 1.2 μm, mean cross-sectional diameter: 1 μm, length: 50 μm, fibrous carbon material). The surface of the thus-obtained insulated ultrafine powder was observed under a scanning electron microscope. Microscopic observation revealed formation of a titanium dioxide coating (thickness: 200 to 500 nm, mean thickness: 300 nm). The resultant cured product was found to have a dielectric constant of 9.2.

As is clear from the data of Example 10 and Comparative Example 1, electrically conductive ultrafine particles having no insulation coating do not function as a dielectric due to electrical conduction, and an insulation coating imparts dielectric property to the ultrafine powder. As is clear from the data of Examples 10 and 11, when insulated ultrafine powders respectively coated with a titanium dioxide hydrate and a zirconium dioxide hydrate—which hydrates, when in a crystalline state, exhibit considerably different dielectric constants but almost the same molecular polarization—are employed, the resultant high-dielectric-constant resin composite materials exhibit almost the same dielectric constant, and therefore the molecular polarization of an insulation coating greatly contributes to the dielectric constant of the resultant resin composite material. As is clear from the data of Examples 10 to 14 [in particular, Example 14, which employs an insulated ultrafine powder prepared by coating carbon black (i.e., spherical electrically conductive ultrafine particles) with an insulation dialuminum trioxide hydrate] and data of Comparative Examples 2 and 3, which employ barium titanate fine powder (i.e., a typical conventional filler), a composite material containing the insulated ultrafine powder of the present invention exhibits high dielectric constant and light weight, even when the amount of the filler added is considerably lower than a conventionally required level.

Example 20

The insulated ultrafine powder obtained in Example 1 (0.2 g) and polyimide varnish (5.3 g, solid content: 15 wt. %) were pounded and mixed by means of a homogenizer for 30 minutes. This corresponds to the case where the insulated ultrafine powder is added in an amount of 10 vol. %. The resultant varnish mixture was applied onto a glass plate, followed by firing at 200° C. for one hour, to thereby form a film. Dielectric constant of the film was measured in a manner similar to that of Example 1. As a result, the film was found to have a relative dielectric constant of 92.1. The film was found to have a specific weight of 1.3.

Figure 2:
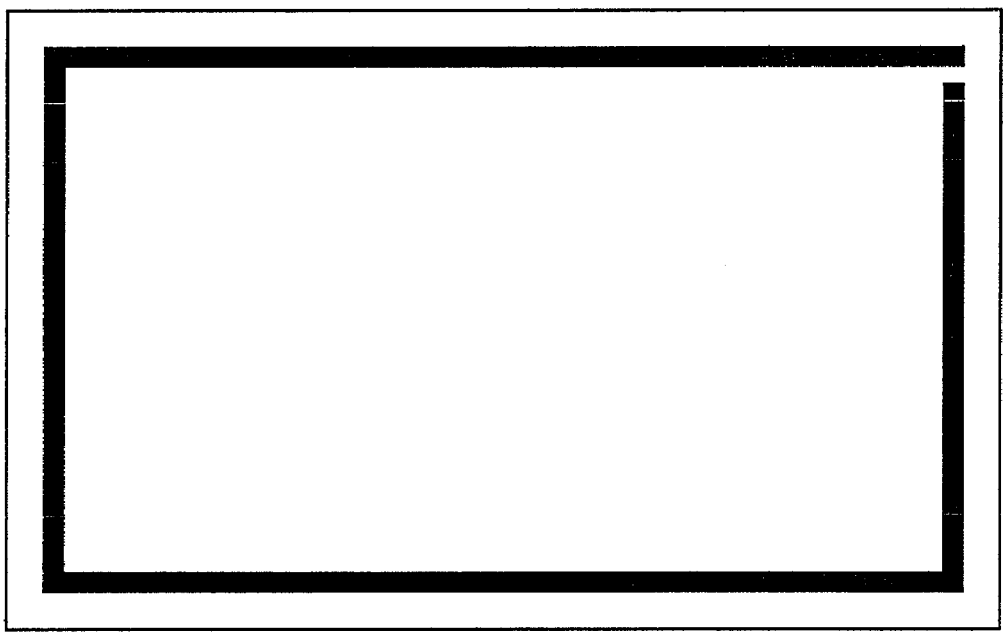
[FIG. 2]

A copper foil (thickness: 12 μm) was dry-laminated on both surfaces of the film, and wiring patterns shown in FIGS. 1 and 2 were formed on the respective surfaces through etching by use of an aqueous ferric chloride solution, to thereby yield an antenna film substrate. A portion of the wiring pattern on the bottom surface of the film was cut so that when the antenna film substrate is in contact with a commuter pass case including a non-contact IC card, the antenna is tuned to 13.56 MHz. When the antenna film substrate was brought into contact with a commuter pass case including a non-contact IC card, data stored in the IC card included in the commuter pass were read by means of a commercially available non-contact IC reader (13.56 MHz) (RC-S310, product of Sony Corporation) which was placed 32 cm away from the substrate.

Example 21

The insulated ultrafine powder obtained in Example 3 (0.35 g) and polyimide varnish (5.3 g, solid content: 15 wt. %) were pounded and mixed by means of a homogenizer for 30 minutes. This corresponds to the case where the insulated ultrafine powder is added in an amount of 20 vol. %. The resultant varnish mixture was applied onto a glass plate, followed by firing at 200° C. for one hour, to thereby form a film. Dielectric constant of the film was measured in a manner similar to that of Example 1. As a result, the film was found to have a relative dielectric constant of 70.1. The film was found to have a specific weight of 1.3. In a manner similar to that of Example 20, a wiring pattern was formed on the film, to thereby yield an antenna film substrate. When the antenna film substrate was brought into contact with a commuter pass case including a non-contact IC card, data stored in the IC card included in the commuter pass were read by means of a commercially available non-contact IC reader which was placed 27 cm away from the substrate.

Example 22

The insulated ultrafine powder obtained in Example 4 (0.25 g) and polyimide varnish (5 g, solid content: 15 wt. %) were pounded and mixed by means of a homogenizer for 30 minutes. This corresponds to the case where the insulated ultrafine powder is added in an amount of 13 vol. %. The resultant varnish mixture was applied onto a glass plate, followed by firing at 200° C. for one hour, to thereby form a film. Dielectric constant of the film was measured in a manner similar to that of Example 1. As a result, the film was found to have a relative dielectric constant of 72.1. The film was found to have a specific weight of 1.3. In a manner similar to that of Example 20, a wiring pattern was formed on the film, to thereby yield an antenna film substrate. When the antenna film substrate was brought into contact with a commuter pass case including a non-contact IC card, data stored in the IC card included in the commuter pass were read by means of a commercially available non-contact IC reader which was placed 20 cm away from the substrate.

Example 23

Carbon nanotube synthesized through the vapor growth process (cross-sectional diameter: 5 to 11 nm, mean cross-sectional diameter: 8 nm, length: 50 to 200 nm, fibrous carbon material) (0.5 g) and tetrapropyloxy titanate (1.8 g) were added to isopropanol (2.5 g), and the resultant mixture was stirred for one hour, followed by stirring at room temperature for one hour. A liquid mixture of distilled water and isopropanol (1:6) (1.3 g) was added dropwise to the resultant dispersion over five minutes. After completion of dropwise addition, the resultant mixture was further stirred for one hour, followed by filtration. The resultant product was allowed to stand for 12 hours for drying, followed by vacuum drying at 100° C. The surface of the thus-obtained powder was observed under a scanning electron microscope. Microscopic observation revealed formation of a titanium dioxide coating (thickness: 2 to 4 nm, mean thickness: 3 nm).

The resultant insulated ultrafine powder (0.25 g) and polyimide varnish (5 g, solid content: 15 wt. %) were pounded and mixed by means of a homogenizer for 30 minutes. This corresponds to the case where the insulated ultrafine powder is added in an amount of 13 vol. %. The resultant varnish mixture was applied onto a glass plate, followed by firing at 200° C. for one hour, to thereby form a film. Dielectric constant of the film was measured in a manner similar to that of Example 1. As a result, the film was found to have a relative dielectric constant of 189. The film was found to have a specific weight of 1.3. In a manner similar to that of Example 20, a wiring pattern was formed on the film, to thereby yield an antenna film substrate. When the antenna film substrate was brought into contact with a commuter pass case including a non-contact IC card, data stored in the IC card included in the commuter pass were read by means of a commercially available non-contact IC reader which was placed 36 cm away from the substrate.

Example 24

Carbon nanofiber synthesized through melt-spinning (cross-sectional diameter: 300 to 500 nm, mean cross-sectional diameter: 400 nm, length: 50 μm, fibrous carbon material) (5 g) and tetrapropyloxy titanate (18 g) were added to isopropanol (25 g), and the resultant mixture was stirred for one hour, followed by stirring at room temperature for one hour. A liquid mixture of distilled water and isopropanol (1:6) (1.3 g) was added dropwise to the resultant dispersion over five minutes. After completion of dropwise addition, the resultant mixture was further stirred for one hour, followed by filtration. The resultant product was allowed to stand for 12 hours for drying, followed by vacuum drying at 100° C. The surface of the thus-obtained powder was observed under a scanning electron microscope. Microscopic observation revealed formation of a titanium dioxide coating (thickness: 90 to 130 nm, mean thickness: 110 nm). The resultant insulated ultrafine powder (0.25 g) and polyimide varnish (5 g, solid content: 15 wt. %) were pounded and mixed by means of a homogenizer for 30 minutes. This corresponds to the case where the insulated ultrafine powder is added in an amount of 13 vol. %. The resultant varnish mixture was applied onto a glass plate, followed by firing at 200° C. for one hour, to thereby form a film. Dielectric constant of the film was measured in a manner similar to that of Example 1. As a result, the film was found to have a relative dielectric constant of 56.3. The film was found to have a specific weight of 1.3. In a manner similar to that of Example 20, a wiring pattern was formed on the film, to thereby yield an antenna film substrate. When the antenna film substrate was brought into contact with a commuter pass case including a non-contact IC card, data stored in the IC card included in the commuter pass were read by means of a commercially available non-contact IC reader which was placed 36 cm away from the substrate.

Example 25

The procedure of Example 20 was repeated, except that the insulated ultrafine powder obtained in Example 1 (0.2 g) and polyimide varnish (16 g, solid content: 15 wt. %) were pounded and mixed by means of a homogenizer for 30 minutes. This corresponds to the case where the insulated ultrafine powder is added in an amount of 5 vol. %. The resultant varnish mixture was applied onto a glass plate, followed by firing at 200° C. for one hour, to thereby form a film. Dielectric constant of the film was measured in a manner similar to that of Example 1. As a result, the film was found to have a relative dielectric constant of 256. The film was found to have a specific weight of 1.3. In a manner similar to that of Example 20, a wiring pattern was formed on the film, to thereby yield an antenna film substrate. When the antenna film substrate was brought into contact with a commuter pass case including a non-contact IC card, data stored in the IC card included in the commuter pass were read by means of a commercially available non-contact IC reader which was placed 47 cm away from the substrate.

Example 26

The procedure of Example 20 was repeated, except that the insulated ultrafine powder obtained in Example 1 (0.2 g) and polyimide varnish (1.1 g, solid content: 15 wt. %) were pounded and mixed by means of a homogenizer for 30 minutes. This corresponds to the case where the insulated ultrafine powder is added in an amount of 40 vol. %. The resultant varnish mixture was applied onto a glass plate, followed by firing at 200° C. for one hour, to thereby form a film. Dielectric constant of the film was measured in a manner similar to that of Example 1. As a result, the film was found to have a relative dielectric constant of 256. The film was found to have a specific weight of 1.6. In a manner similar to that of Example 20, a wiring pattern was formed on the film, to thereby yield an antenna film substrate which is tuned to 13.56 MHz. When the antenna film substrate was brought into contact with a commuter pass case including a non-contact IC card, data stored in the IC card included in the commuter pass were read by means of a commercially available non-contact IC reader which was placed 28 cm away from the substrate.

Example 27

The procedure of Example 20 was repeated, except that the amount of tetrapropyloxy titanate added was changed to 0.5 g. The surface of the thus-obtained insulated ultrafine powder was observed under a scanning electron microscope. Microscopic observation revealed formation of a titanium dioxide coating (thickness: 2 to 7 nm, mean thickness: 5 nm).

The resultant film was found to have a dielectric constant of 178 and a specific weight of 1.3. In a manner similar to that of Example 20, a wiring pattern was formed on the film, to thereby yield an antenna film substrate which is tuned to 13.56 MHz. When the antenna film substrate was brought into contact with a commuter pass case including a non-contact IC card, data stored in the IC card included in the commuter pass were read by means of a commercially available non-contact IC reader which was placed 46 cm away from the substrate.

Example 28

The procedure of Example 20 was repeated, except that the amount of tetrapropyloxy titanate added was changed to 10 g. The surface of the thus-obtained insulated ultrafine powder was observed under a scanning electron microscope. Microscopic observation revealed formation of a titanium dioxide coating (thickness: 70 to 130 nm, mean thickness: 100 nm). The resultant film was found to have a dielectric constant of 47.3 and a specific weight of 1.3. In a manner similar to that of Example 20, a wiring pattern was formed on the film, to thereby yield an antenna film substrate which is tuned to 13.56 MHz. When the antenna film substrate was brought into contact with a commuter pass case including a non-contact IC card, data stored in the IC card included in the commuter pass were read by means of a commercially available non-contact IC reader which was placed 18 cm away from the substrate.

Comparative Example 7

In the case where a commuter pass case including a non-contact IC card was provided alone, when a commercially available non-contact IC reader was placed 1 cm or more away from the commuter pass, data stored in the IC card were not read by means of the IC reader.

Comparative Example 8

The procedure of Example 20 was repeated, except that insulated ultrafine powder was not added, to thereby yield a film substrate in which a wiring pattern was provided on a polyimide film formed through firing. In the case where the polyimide film substrate was brought into contact with a commuter pass case including a non-contact IC card, when a commercially available non-contact IC card reader/writer was placed 1 cm or more away from the substrate, data stored in the IC card were not read by means of the IC card reader/writer. That is, the polyimide film substrate failed to function as an antenna board.

Comparative Example 9

The procedure of Example 20 was repeated, except that carbon nanofiber which had not been subjected to insulation treatment was added, to thereby yield a film substrate in which a wiring pattern was provided on a polyimide film formed through firing. In the case where the polyimide film substrate was brought into contact with a commuter pass case including a non-contact IC card, when a commercially available non-contact IC card reader/writer was placed 1 cm or more away from the substrate, data stored in the IC card were not read by means of the IC card reader/writer. That is, the polyimide film substrate failed to function as an antenna board.

Comparative Example 10

The procedure of Example 20 was repeated, except that the insulated ultrafine powder obtained in Example 1 (0.2 g) and polyimide varnish (0.44 g) were mixed. This corresponds to the case where the insulated ultrafine powder is added in an amount of 60 vol. %. In this case, a flexible film failed to be formed. Therefore, dielectric constant, etc. failed to be measured, and an antenna board failed to be obtained.

Comparative Example 11

The procedure of Example 20 was repeated, except that the amount of tetrapropyloxy titanate added was changed to 66 g. The surface of the thus-obtained insulated ultrafine powder was observed under a scanning electron microscope. Microscopic observation revealed formation of a titanium dioxide coating (thickness: 200 to 400 nm, mean thickness: 300 nm).

The resultant polyimide film was found to have a dielectric constant of 16.3 and a specific weight of 1.3. In a manner similar to that of Example 20, a wiring pattern was provided on the film, to thereby yield a polyimide film substrate. In the case where the polyimide film substrate was brought into contact with a commuter pass case including a non-contact IC card, when a commercially available non-contact IC card reader/writer was placed 1 cm or more away from the substrate, data stored in the IC card were not read by means of the IC card reader/writer. That is, the polyimide film substrate failed to function as an antenna board.

Comparative Example 12

The procedure of Example 20 was repeated, except that the carbon nanofiber was replaced by carbon fiber milled with a ball mill (cross-sectional diameter: 800 nm to 1.2 μm, mean cross-sectional diameter: 1 μm, length: 50 μm, fibrous carbon material). The surface of the thus-obtained insulated ultrafine powder was observed under a scanning electron microscope. Microscopic observation revealed formation of a titanium dioxide coating (thickness: 200 to 500 nm, mean thickness: 300 nm).

The resultant polyimide film was found to have a dielectric constant of 9.2. In a manner similar to that of Example 20, a wiring pattern was provided on the film, to thereby yield a polyimide film substrate. In the case where the polyimide film substrate was brought into contact with a commuter pass case including a non-contact IC card, when a commercially available non-contact IC card reader/writer was placed 1 cm or more away from the substrate, data stored in the IC card were not read by means of the IC card reader/writer. That is, the polyimide film substrate failed to function as an antenna board.

Example 29

Carbon nanofiber (cross-sectional diameter: 150 nm, length: 5 to 6 μm) (5 g) and tetrapropyloxy titanate (4.5 g) were added to isopropanol (150 g), and the resultant mixture was stirred at room temperature for one hour. A liquid mixture of distilled water and isopropanol (1:6) (77 g) was added dropwise to the resultant dispersion over five minutes. After completion of dropwise addition, the resultant mixture was further stirred for one hour, followed by filtration. The resultant product was allowed to stand for 12 hours for drying, followed by vacuum drying at 100° C.

The thus-obtained insulated ultrafine powder (2 g), a bisphenol A epoxy monomer (EP-4100G, product of Adeka Corporation) (8 g), an imidazole curing catalyst (Curezol 2E4MZ, product of Shikoku Chemicals Corporation) (0.16 g), and methyl ethyl ketone (i.e., a solvent) (10 g) were pounded and mixed by means of a homogenizer for 30 minutes. This corresponds to the case where the insulated ultrafine powder is added in an amount of 10 vol. %. The thus-obtained mixture was placed in a Teflon petri dish, and then allowed to stand for 12 hours for drying, followed by heating at 120° C. for three hours, to thereby yield a sheet-like cured product having a thickness of 1 mm. Dielectric constant of the cured product was measured in a manner similar to that of Example 1. As a result, the cured product was found to have a relative dielectric constant of 96.1. The cured product was found to have a specific weight of 1.3.

Figure 3:
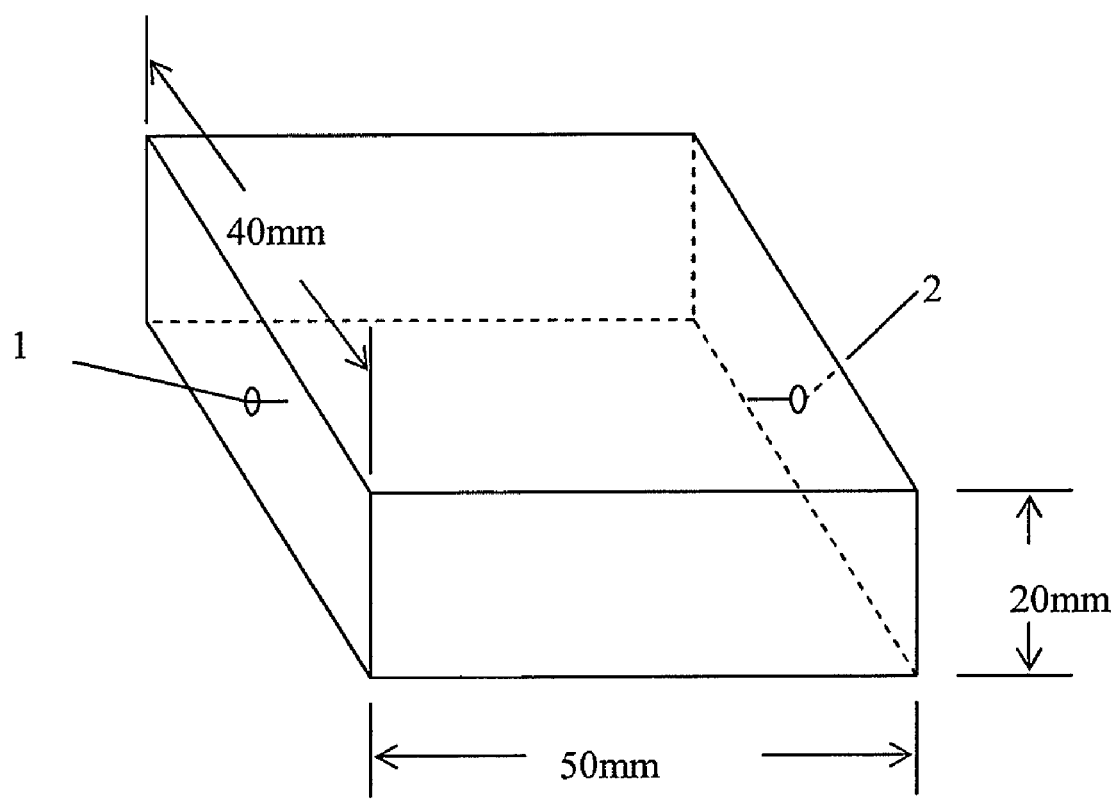
[FIG. 3]

Subsequently, as shown in FIG. 3, a brass cavity resonator (dimensions: 50 mm×40 mm×20 mm) was prepared, and an input terminal 1 and an output terminal 2 were respectively provided on facing side walls. S parameter between the input and output (5 GHz to 15 GHz) was measured by means of 8722ES Network Analyzer (product of Agilent) for observation of peaks in a resonance spectrum of the cavity resonator. A peak corresponding to 10.3 GHz (wavelength: 30 mm) was found to occur at a level of −3dB. This peak corresponds to an unnecessary radio wave in a casing of the resonator. Subsequently, the sheet-like cured product (thickness: 1 mm) was placed in the cavity resonator, and S parameter was measured in a manner similar to that described above. The peak was found to disappear. Disappearance of the peak indicates that the sheet-like cured product (thickness: 1 mm) exhibits high radio-wave-absorbing effect.

Example 30

Natural graphite (thickness: 100 to 200 nm, mean thickness: 150 nm, size: 1×1 to 3×3 μm, mean size: 2×2 μm, plate-like carbon material) (5 g) and tetrapropyloxy titanate (0.6 g) were added to isopropanol (25 g), and the resultant mixture was stirred for one hour, followed by stirring at room temperature for one hour. A liquid mixture of distilled water and isopropanol (1:6) (4 g) was added dropwise to the resultant dispersion over five minutes. After completion of dropwise addition, the resultant mixture was further stirred for one hour, followed by filtration. The resultant product was allowed to stand for 12 hours for drying, followed by vacuum drying at 100° C.

The thus-obtained insulated ultrafine powder (3.5 g), a bisphenol A epoxy monomer (EP-4100G, product of Adeka Corporation) (6.5 g), an imidazole curing catalyst (Curezol 2E4MZ, product of Shikoku Chemicals Corporation) (0.13 g), and methyl ethyl ketone (i.e., a solvent) (10 g) were pounded and mixed by means of a homogenizer for 30 minutes. This corresponds to the case where the insulated ultrafine powder is added in an amount of 20 vol. %. The thus-obtained mixture was placed in a Teflon petri dish, and then allowed to stand for 12 hours for drying. The thus-obtained paste was heated at 120° C. for three hours, to thereby yield a sheet-like cured product having a thickness of 1 mm. Dielectric constant of the cured product was measured in a manner similar to that of Example 1. As a result, the cured product was found to have a relative dielectric constant of 70.1. The cured product was found to have a specific weight of 1.3.

In a manner similar to that of Example 29, the sheet-like cured product was placed in the cavity resonator, and S parameter was measured. A peak corresponding to 10.3 GHz (wavelength: 30 mm) was found to disappear. Disappearance of the peak indicates that the sheet-like cured product (thickness: 1 mm) exhibits high radio-wave-absorbing effect.

Example 31

Electrically conductive carbon black (particle diameter: 10 to 30 nm, mean particle diameter: 25 nm) (5 g) and tetrapropyloxy titanate (1.8 g) were added to isopropanol (25 g), and the resultant mixture was stirred for one hour, followed by stirring at room temperature for one hour. A liquid mixture of distilled water and isopropanol (1:6) (13 g) was added dropwise to the resultant dispersion over five minutes. After completion of dropwise addition, the resultant mixture was further stirred for one hour, followed by filtration. The resultant product was allowed to stand for 12 hours for drying, followed by vacuum drying at 100° C.

The thus-obtained insulated ultrafine powder (2.5 g), a bisphenol A epoxy monomer (EP-4100G, product of Adeka Corporation) (7.5 g), an imidazole curing catalyst (Curezol 2E4MZ, product of Shikoku Chemicals Corporation) (0.15 g), and methyl ethyl ketone (i.e., a solvent) (10 g) were pounded and mixed by means of a homogenizer for 30 minutes. This corresponds to the case where the insulated ultrafine powder is added in an amount of 15 vol. %. The thus-obtained mixture was placed in a Teflon petri dish, and then allowed to stand for 12 hours for drying. The thus-obtained paste was heated at 120° C. for three hours, to thereby yield a sheet-like cured product having a thickness of 1 mm. Dielectric constant of the cured product was measured in a manner similar to that of Example 1. As a result, the cured product was found to have a relative dielectric constant of 71.6. The cured product was found to have a specific weight of 1.3.

In a manner similar to that of Example 29, the sheet-like cured product was placed in the cavity resonator, and S parameter was measured. A peak corresponding to 10.3 GHz (wavelength: 30 mm) was found to disappear. Disappearance of the peak indicates that the sheet-like cured product (thickness: 1 mm) exhibits high radio-wave-absorbing effect.

Example 32

Carbon nanotube synthesized through the vapor growth process (cross-sectional diameter: 5 to 11 nm, mean cross-sectional diameter: 8 nm, length: 50 to 200 nm, fibrous carbon material) (0.5 g) and tetrapropyloxy titanate (1.8 g) were added to isopropanol (2.5 g), and the resultant mixture was stirred for one hour, followed by stirring at room temperature for one hour. A liquid mixture of distilled water and isopropanol (1:6) (1.3 g) was added dropwise to the resultant dispersion over five minutes. After completion of dropwise addition, the resultant mixture was further stirred for one hour, followed by filtration. The resultant product was allowed to stand for 12 hours for drying, followed by vacuum drying at 100° C. The surface of the thus-obtained powder was observed under a scanning electron microscope. Microscopic observation revealed formation of a titanium dioxide coating (thickness: 2 to 4 nm, mean thickness: 3 nm).

The resultant insulated ultrafine powder (2 g), a bisphenol A epoxy monomer (EP-4100G, product of Adeka Corporation) (8 g), an imidazole curing catalyst (Curezol 2E4MZ, product of Shikoku Chemicals Corporation) (0.16 g), and methyl ethyl ketone (i.e., a solvent) (10 g) were pounded and mixed by means of a homogenizer for 30 minutes. The thus-obtained mixture was placed in a Teflon petri dish, and then allowed to stand for 12 hours for drying, followed by heating at 120° C. for three hours, to thereby yield a sheet-like cured product having a thickness of 1 mm. This corresponds to the case where the insulated ultrafine powder is added in an amount of 10 vol. %. Dielectric constant of the cured product was measured in a manner similar to that of Example 1. As a result, the cured product was found to have a relative dielectric constant of 189. The cured product was found to have a specific weight of 1.3.

In a manner similar to that of Example 29, the sheet-like cured product was placed in the cavity resonator, and S parameter was measured. A peak corresponding to 10.3 GHz (wavelength: 30 mm) was found to disappear. Disappearance of the peak indicates that the sheet-like cured product (thickness: 1 mm) exhibits high radio-wave-absorbing effect.

Example 33

Carbon nanofiber synthesized through melt-spinning (cross-sectional diameter: 300 to 500 nm, mean cross-sectional diameter: 400 nm, length: 50 µm, fibrous carbon material) (5 g) and tetrapropyloxy titanate (18 g) were added to isopropanol (25 g), and the resultant mixture was stirred for one hour, followed by stirring at room temperature for one hour. A liquid mixture of distilled water and isopropanol (1:6) (1.3 g) was added dropwise to the resultant dispersion over five minutes. After completion of dropwise addition, the resultant mixture was further stirred for one hour, followed by filtration. The resultant product was allowed to stand for 12 hours for drying, followed by vacuum drying at 100° C. The surface of the thus-obtained powder was observed under a scanning electron microscope. Microscopic observation revealed formation of a titanium dioxide coating (thickness: 90 to 130 nm, mean thickness: 110 nm).

The resultant insulated ultrafine powder (2 g), a bisphenol A epoxy monomer (EP-4100G, product of Adeka Corporation) (8 g), an imidazole curing catalyst (Curezol 2E4MZ, product of Shikoku Chemicals Corporation) (0.16 g), and methyl ethyl ketone (i.e., a solvent) (10 g) were pounded and mixed by means of a homogenizer for 30 minutes. The thus-obtained mixture was placed in a Teflon petri dish, and then allowed to stand for 12 hours for drying, followed by heating at 120° C. for three hours, to thereby yield a sheet-like cured product having a thickness of 1 mm. This corresponds to the case where the insulated ultrafine powder is added in an amount of 10 vol. %.

In a manner similar to that of Example 29, the sheet-like cured product was placed in the cavity resonator, and S parameter was measured. A peak corresponding to 10.3 GHz (wavelength: 30 mm) was found to disappear. Disappearance of the peak indicates that the sheet-like cured product (thickness: 1 mm) exhibits high radio-wave-absorbing effect.

Example 34

The procedure of Example 29 was repeated, except that the insulated ultrafine powder obtained in Example 29 (1 g), a bisphenol A epoxy monomer (EP-4100G, product of Adeka Corporation) (9 g), an imidazole curing catalyst (Curezol 2E4MZ, product of Shikoku Chemicals Corporation) (0.16 g), and methyl ethyl ketone (i.e., a solvent) (10 g) were pounded and mixed by means of a homogenizer for 30 minutes, to thereby yield a sheet-like cured product. This corresponds to the case where the insulated ultrafine powder is added in an amount of 5 vol. %. Dielectric constant of the cured product was measured in a manner similar to that of Example 1. As a result, the cured product was found to have a relative dielectric constant of 256. The cured product was found to have a specific weight of 1.3.

In a manner similar to that of Example 29, the sheet-like cured product was placed in the cavity resonator, and S parameter was measured. A peak corresponding to 10.3 GHz (wavelength: 30 mm) was found to disappear. Disappearance of the peak indicates that the sheet-like cured product (thickness: 1 mm) exhibits high radio-wave-absorbing effect.

Example 35

The procedure of Example 29 was repeated, except that the insulated ultrafine powder obtained in Example 29 (4 g), a bisphenol A epoxy monomer (EP-4100G, product of Adeka Corporation) (4 g), an imidazole curing catalyst (Curezol 2E4MZ, product of Shikoku Chemicals Corporation) (0.08 g), and methyl ethyl ketone (i.e., a solvent) (10 g) were pounded and mixed by means of a homogenizer for 30 minutes, to thereby yield a sheet-like cured product. This corresponds to the case where the insulated ultrafine powder is added in an amount of 40 vol. %. Dielectric constant of the cured product was measured in a manner similar to that of Example 1. As a result, the cured product was found to have a relative dielectric constant of 256. The cured product was found to have a specific weight of 1.6.

In a manner similar to that of Example 29, the sheet-like cured product was placed in the cavity resonator, and S parameter was measured. A peak corresponding to 10.3 GHz (wavelength: 30 mm) was found to disappear. Disappearance of the peak indicates that the sheet-like cured product (thickness: 1 mm) exhibits high radio-wave-absorbing effect.

Example 36

The procedure of Example 29 was repeated, except that the amount of tetrapropyloxy titanate added was changed to 0.5 g. The surface of the thus-obtained insulated ultrafine powder was observed under a scanning electron microscope. Microscopic observation revealed formation of a titanium dioxide coating (thickness: 2 to 7 nm, mean thickness: 5 nm). In a manner similar to that of Example 29, the insulated ultrafine powder was mixed with an epoxy resin, and a sheet-like cured product was produced. The cured product was found to have a dielectric constant of 178 and a specific weight of 1.3. In a manner similar to that of Example 29, the sheet-like cured product was placed in the cavity resonator, and S parameter was measured. A peak corresponding to 10.3 GHz (wavelength: 30 mm) was found to disappear. Disappearance of the peak indicates that the sheet-like cured product (thickness: 1 mm) exhibits high radio-wave-absorbing effect.

Example 37

The procedure of Example 29 was repeated, except that the amount of tetrapropyloxy titanate added was changed to 22 g. The surface of the thus-obtained insulated ultrafine powder was observed under a scanning electron microscope. Microscopic observation revealed formation of a titanium dioxide coating (thickness: 70 to 130 nm, mean thickness: 100 nm). The resultant sheet-like cured product was found to have a dielectric constant of 47.3 and a specific weight of 1.3. In a manner similar to that of Example 29, the sheet-like cured product was placed in the cavity resonator, and S parameter was measured. A peak corresponding to 10.3 GHz (wavelength: 30 mm) was found to disappear. Disappearance of the peak indicates that the sheet-like cured product (thickness: 1 mm) exhibits high radio-wave-absorbing effect.

Comparative Example 13

The procedure of Example 29 was repeated, except that insulated ultrafine powder was not added. The resultant cured product was found to have a dielectric constant of 4.8. Splitting was observed in resonance peaks corresponding to 10.6 GHz and 10.8 GHz. That is, the cured product exhibited virtually no effect of suppressing such peak splitting.

Comparative Example 14

The procedure of Example 29 was repeated, except that carbon nanofiber which had not been subjected to insulation treatment was added to an epoxy resin. Occurrence of a peak corresponding to 10.6 GHz was observed. That is, the resultant cured product exhibited no radio-wave-absorbing effect.

Comparative Example 15

The procedure of Example 29 was repeated, except that the insulated ultrafine powder obtained in Example 29 (7 g) and a bisphenol A epoxy monomer (3 g) were mixed. This corresponds to the case where the insulated ultrafine powder is added in an amount of 60 vol. %. In this case, merely a very brittle cured product was obtained. Therefore, dielectric constant, etc. failed to be measured, and radio-wave-absorbing property failed to be evaluated.

Comparative Example 16

The procedure of Example 29 was repeated, except that the amount of tetrapropyloxy titanate added was changed to 66 g. The surface of the thus-obtained insulated ultrafine powder was observed under a scanning electron microscope. Microscopic observation revealed formation of a titanium dioxide coating (thickness: 200 to 400 nm, mean thickness: 300 nm).

The resultant cured product was found to have a dielectric constant of 16.3 and a specific weight of 1.3. The cured product was placed in the cavity resonator in a manner similar to that of Example 29, but occurrence of a peak corresponding to 10.7 GHz was observed. That is, the cured product exhibited no radio-wave-absorbing effect.

Comparative Example 17

The procedure of Example 29 was repeated, except that the carbon nanofiber was replaced by carbon fiber milled with a ball mill (cross-sectional diameter: 800 nm to 1.2 μm, mean cross-sectional diameter: 1 μm, length: 50 μm, fibrous carbon material). The surface of the thus-obtained insulated ultrafine powder was observed under a scanning electron microscope. Microscopic observation revealed formation of a titanium dioxide coating (thickness: 200 to 500 nm, mean thickness: 300 nm). The resultant cured product was found to have a dielectric constant of 9.2. The cured product was placed in the cavity resonator in a manner similar to that of Example 29, but occurrence of a peak corresponding to 10.7 GHz was observed. That is, the cured product exhibited no radio-wave-absorbing effect.

INDUSTRIAL APPLICABILITY

A resin composite material containing a small amount of the insulated ultrafine powder of the present invention exhibits high dielectric constant and radio wave absorbability, while maintaining fundamental characteristics of resin material (i.e., excellent moldability and workability, and light weight). The antenna board of the present invention, which comprises the resin composite material, can attain miniaturization and performance enhancement of an antenna for wireless data communication of, for example, a non-contact IC card/tag.

The invention claimed is:

1. An insulated ultrafine powder comprising electrically conductive ultrafine particles coated with an insulation coating, characterized in that the electrically conductive ultrafine particles are formed of a carbon material which is in the form of spherical particles having a diameter of 1 nm or more and 500 nm or less, fibers having a cross-sectional diameter of 1 nm or more and 500 nm or less, or plate-like particles having a thickness of 1 nm or more and 500 nm or less;
the insulation coating is formed of an insulating metal oxide or a hydrate thereof;
the thickness of the insulation coating is 0.3 nm or more, and
when the electrically conductive ultrafine particles are in the form of spherical particles, the coating thickness is equal to or less than the diameter of the particles; when the electrically conductive ultrafine particles are in the form of fibers, the coating thickness is equal to or less than the cross-sectional diameter of the fibers; or when the electrically conductive ultrafine particles are in the form of plate-like particles, the coating thickness is equal to or less than the thickness of the plate-like particles;
wherein the insulating metal oxide is an insulating metal oxide having a molecular polarization of 5 cm$^3$ or more, or a hydrate thereof; and
wherein the insulating metal oxide or a hydrate thereof is titanium dioxide, zirconium dioxide, ditantalum pentoxide, a solid solution of zirconium dioxide and silicon dioxide, silicon dioxide, dialuminum trioxide, or a hydrate of any of these metal oxides.

2. An insulated ultrafine powder as described in claim 1, wherein the insulation coating is formed of an insulating composite metal oxide represented by the compositional formula: $MTi_{1-x}Zr_xO_3$ (wherein M represents a divalent metal, and x is 0 or more and less than 1).

3. An insulated ultrafine powder as described in claim 1, wherein the surface of the carbon material has been subjected to oxidation treatment.

4. An insulated ultrafine powder as described in claim 1, wherein the carbon material is carbon nanofiber, natural graphite, furnace carbon black, graphitized carbon black, carbon nanotube, or artificial graphite.

5. A high-dielectric-constant resin composite material containing an insulated ultrafine powder as recited in claim 1, and a resin, wherein the ratio by volume of the insulated ultrafine powder to the resin is 5/95 to 50/50.

6. A high-dielectric-constant resin composite material as described in claim 5, which has a specific weight of 2 or less.

7. A high-dielectric-constant resin composite material as described in claim 5, which further contains a filler.

8. A high-dielectric-constant resin composite material as described in claim 5, which has a relative dielectric constant of 20 or more.

9. An antenna board comprising a high-dielectric-constant resin composite material as recited in claim 5.

10. An antenna board as described claim 9, which comprises at least one layer which is formed of the high-dielectric-constant resin composite material, and which has a thickness of 1 µm or more and 3 mm or less.

11. A non-contact IC card/tag characterized by comprising an antenna board as recited in claim 9.

12. A radio wave absorber comprising a high-dielectric-constant resin composite material as recited in claim 5.

13. A radio-wave-absorbing sheet comprising a radio wave absorber as recited in claim 12, which has a thickness 1/20 or less the wavelength of a radio wave which is absorbed therein.

14. An electronic device comprising, in the interior of a casing, a radio wave absorber as recited claim 12.

15. A high-dielectric-constant film or sheet formed from a high-dielectric-constant resin composite material as recited in claim 5.

16. An electronic component characterized by comprising a high-dielectric-constant film or sheet as recited in claim 15.

17. An electronic component formed from a high-dielectric-constant resin composite material as recited in claim 5.

18. A high-dielectric-constant resin composite material containing an insulated ultrafine powder as recited in claim 5, wherein said ratio is 5/95 to 30/70.

19. A method for producing an insulated ultrafine powder as recited in claim 1, the method comprising a step of depositing a metal oxide or a hydrate thereof on the surface of electrically conductive ultrafine particles through sol-gel reaction of at least one metal alkoxide in an organic solvent in which the electrically conductive ultrafine particles are dispersed and the metal alkoxide is dissolved.

20. An insulated ultrafine powder production method as described in claim 19, which comprises the step of depositing a metal oxide or a hydrate thereof on the surface of electrically conductive ultrafine particles; and subsequently a step of firing the resultant product in a non-oxidative atmosphere.

21. An insulated ultrafine powder production method as described in claim 19, which comprises the step of depositing a metal oxide or a hydrate thereof on the surface of electrically conductive ultrafine particles; and subsequently a step of heating a coating reaction mixture, to thereby dehydrate the metal oxide or a hydrate thereof in a liquid phase.

22. An insulated ultrafine powder as described in claim 1, wherein said molecular polarization is 15 cm$^3$ or more.

23. An insulated ultrafine powder comprising electrically conductive ultrafine particles coated with an insulation coating, characterized in that the electrically conductive ultrafine particles are formed of a carbon material which is in the form of spherical particles having a diameter of 1 nm or more and 500 nm or less, fibers having a cross-sectional diameter of 1 nm or more and 500 nm or less, or plate-like particles having a thickness of 1 nm or more and 500 nm or less;
the insulation coating is formed of an insulating metal oxide or a hydrate thereof;
the thickness of the insulation coating is 0.3 nm or more, and
when the electrically conductive ultrafine particles are in the form of spherical particles, the coating thickness is equal to or less than the diameter of the particles; when the electrically conductive ultrafine particles are in the form of fibers, the coating thickness is equal to or less than the cross-sectional diameter of the fibers; or when the electrically conductive ultrafine particles are in the form of plate-like particles, the coating thickness is equal to or less than the thickness of the plate-like particles; and
wherein the insulation coating is formed of an insulating composite metal oxide represented by the compositional formula: $MTi_{1-x}Zr_xO_3$ (wherein M represents a divalent metal, and x is 0 or more and less than 1).

24. An insulated ultrafine powder as described in claim 23, wherein the insulating composite metal oxide is barium titanate, strontium titanate, lead titanate, barium titanate zirconate, lead titanate zirconate, or an insulating solid solution containing, in its composition, at least one species selected from among these oxides.

* * * * *